FIG 2
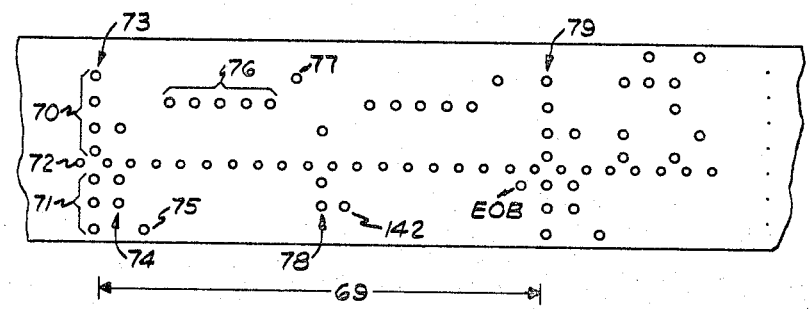
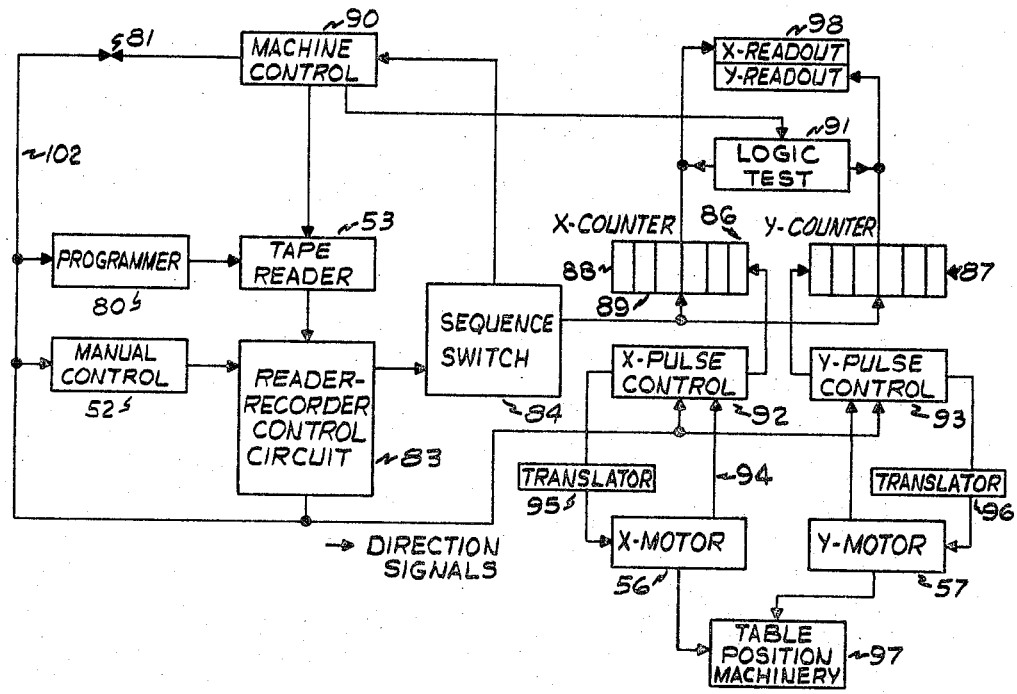
FIG 3

Dec. 3, 1968    D. W. ORAHOOD ETAL    3,414,785
CONTROL CIRCUIT FOR NUMERICALLY POSITIONED TABLE
Filed Sept. 12, 1963    9 Sheets-Sheet 3

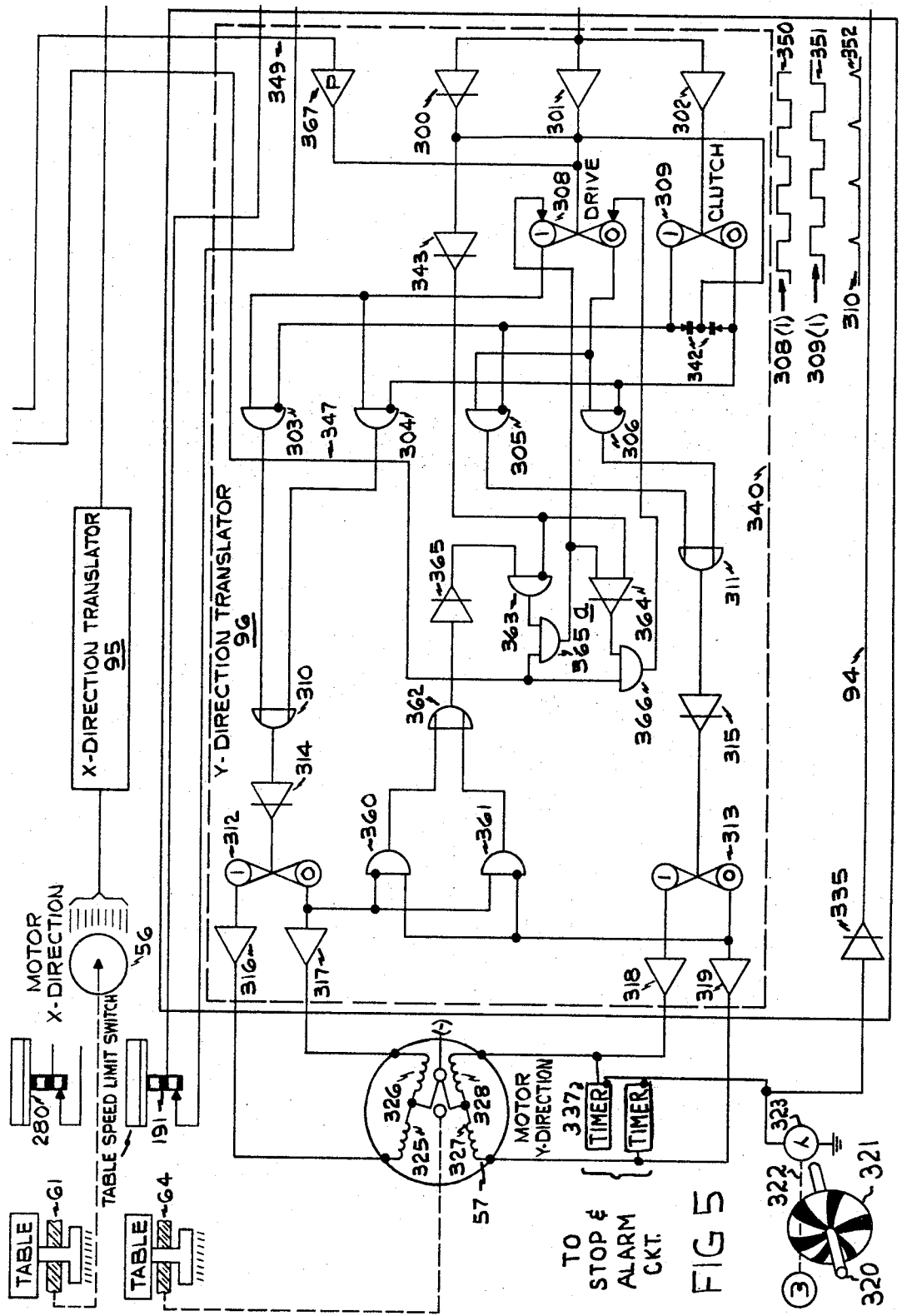

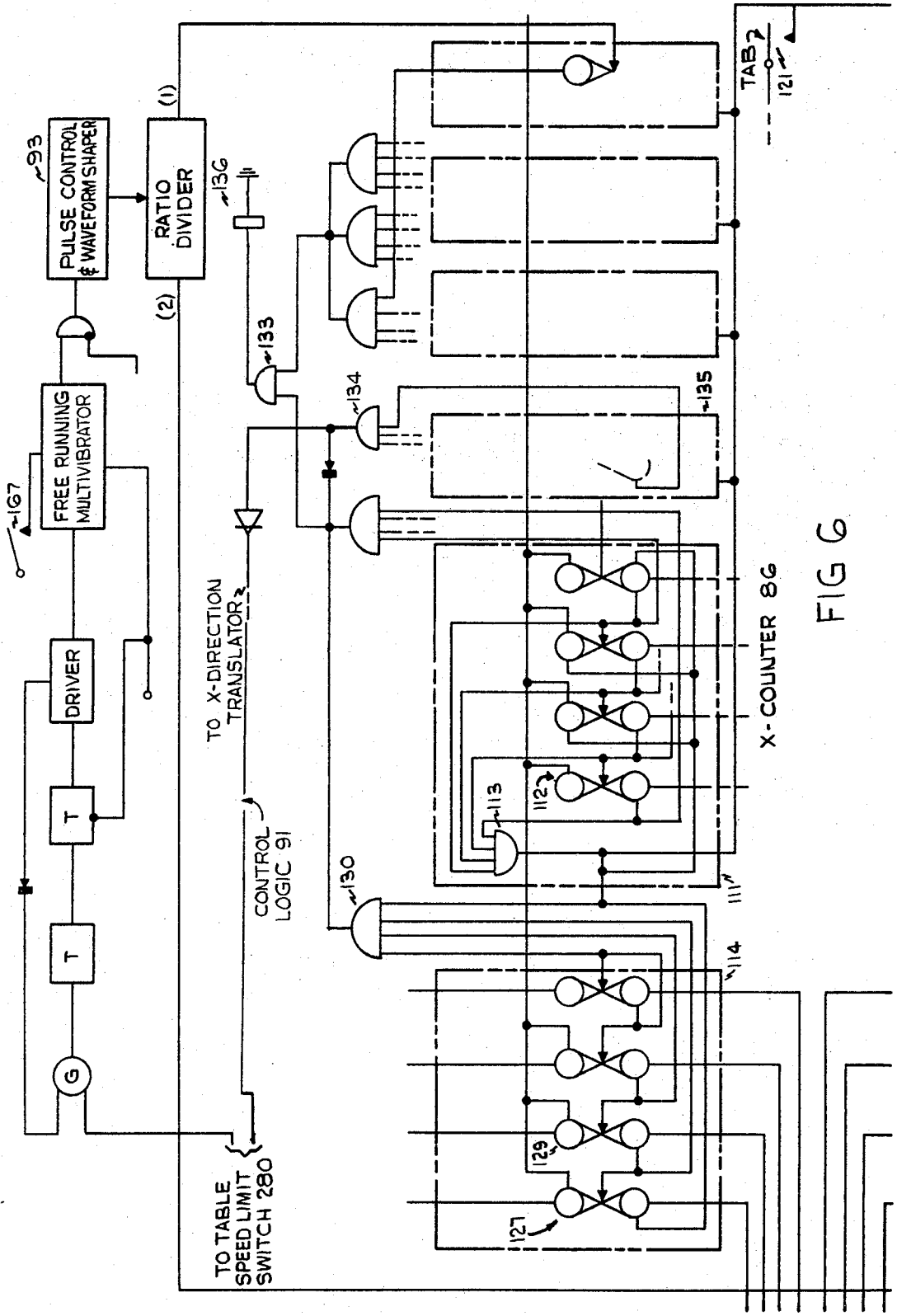

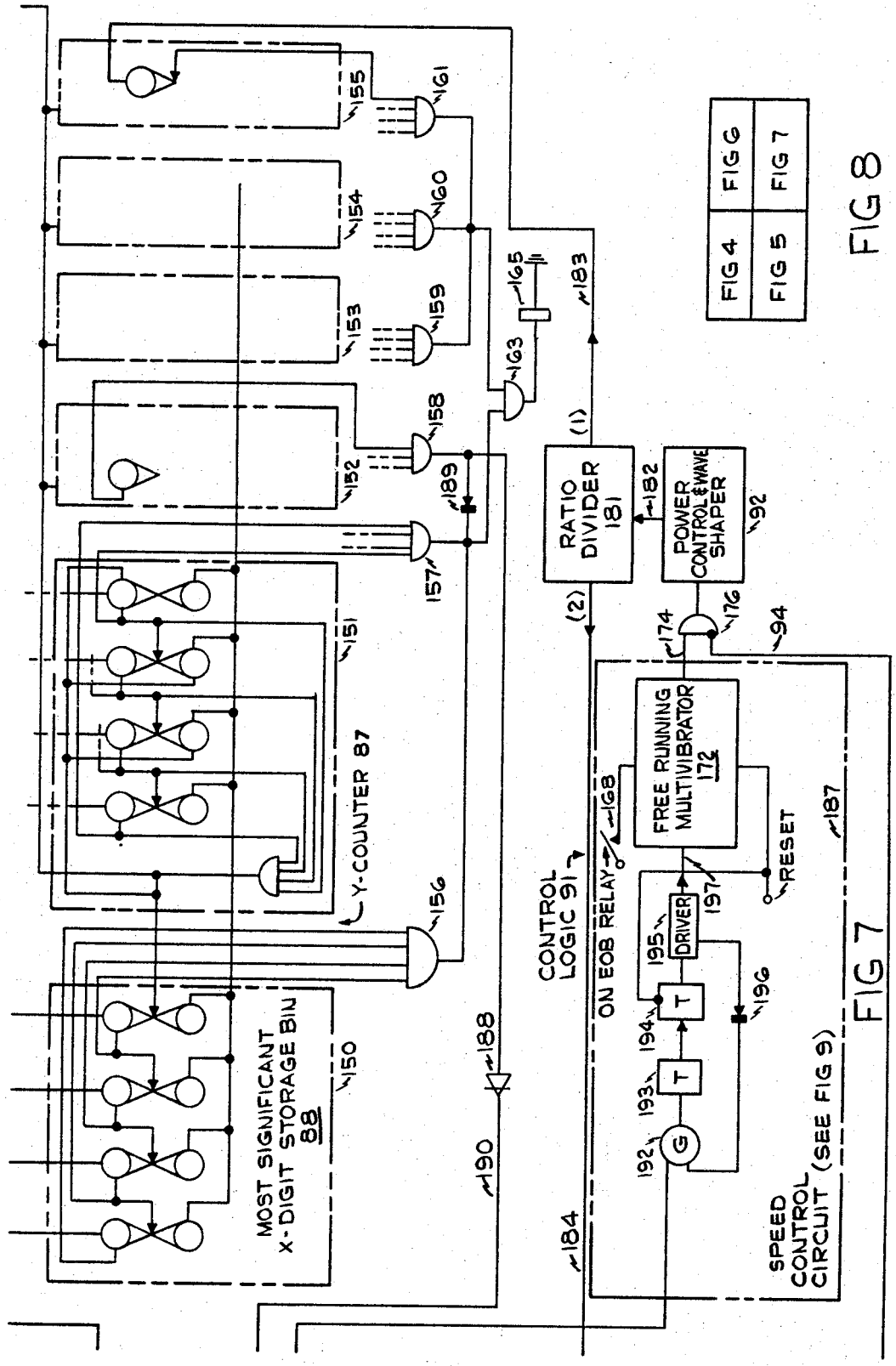

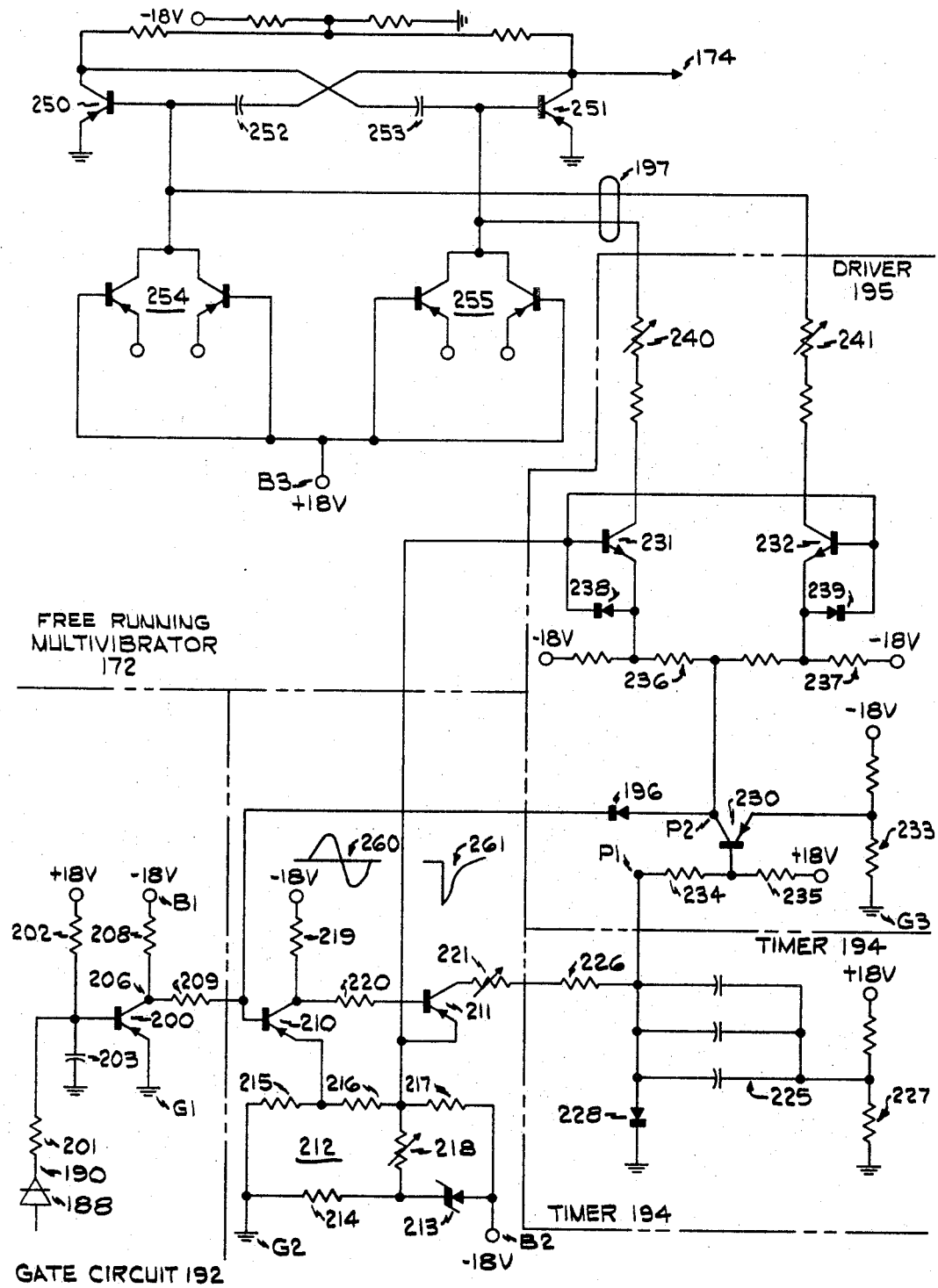

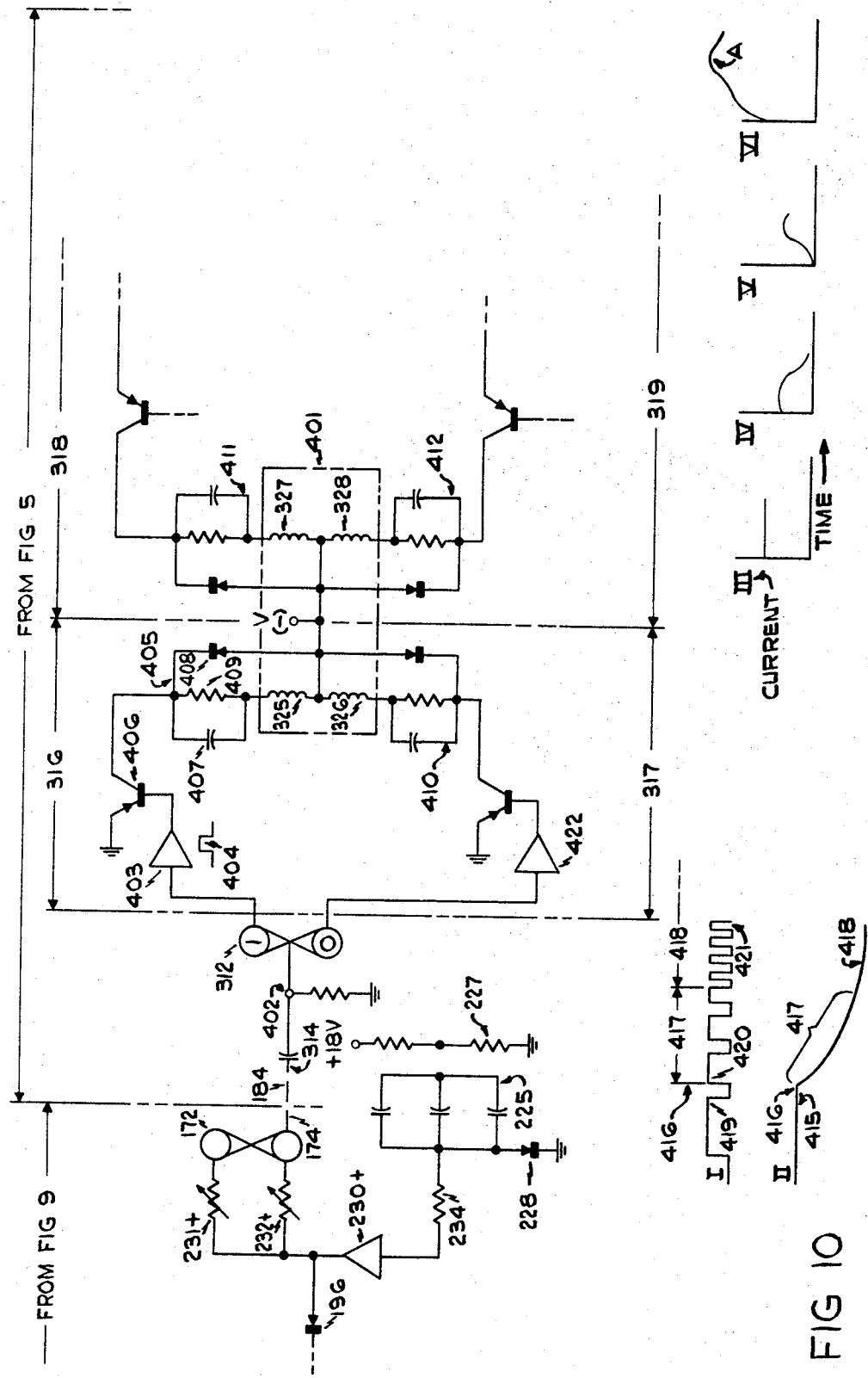

3,414,785
CONTROL CIRCUIT FOR NUMERICALLY
POSITIONED TABLE
Donald W. Orahood, Raymond A. Slenys, and Creighton Stanley Warren, Chicago, Ill., assignors to International Telephone and Telegraph Corporation, a corporation of Maryland
Filed Sept. 12, 1963, Ser. No. 308,388
37 Claims. (Cl. 318—18)

ABSTRACT OF THE DISCLOSURE

A numerical positioning table is driven in X and Y directions by separate drive units, each unit including a stepping motor and a feed screw. A counter, for each direction, stores as indication of the total number of steps which the table is required to take in that direction in order to reach a commanded location. Then, a pulse source simultaneously and sequentially steps the motor and subtracts counts from the counters until they reach their zero count, at which time the table is in position and the counting stops. Special circuit controls increase the stepping speed to provide a very high speed of table travel.

---

This invention relates to numerically positioned tables and especially—although not exclusively—to inexpensive tables for general purpose use on conventional machine tools.

Positioned tables are devices which utilize information stored in any suitable storage media to control the position of a work piece, usually with respect to a numerically controlled automatic machine tool. For good reasons, any reference to numerically controlled machine tool generally brings forth a vision of an enormously expensive machine. Probably this is because the cost of adding numerical controls to simple machine tools has been prohibitive. This is unfortunate because many of the smaller, simpler machines perform routine tasks which should be automated. Thus, there is a great need for a simple, inexpensive attachment which may be added to almost any machine tools for automatically positioning work piece on those tools.

Accordingly, an object of this invention is to provide new and improved numerically positioned table. In particular, an object is to provide inexpensive numerical controls for use in connection with conventional machine tools. More specifically, an object is to provide numerically controlled positioning tables which may be added to any suitable machine—either an expensive or an inexpensive machine for supporting a work piece in any convenient location with respect to the working tool of such machine.

Another object is to provide numerically controlled positioning tables assembled from readily available, non-specal parts. In particular, an object is to provide numerically controlled positioning tables of such a low cost that they may be economically added to simple machine tools. Conversely, an object is to provide numerically controlled positioning tables which are not limited to use with machine tools, but has general utility and may be used any time that numerical positioning is desired.

Yet another object of the invention is to control the speed of motors used to drive these tables into desired positions. In particular, an object is to provide circuitry required to drive stepping motors at their maximum speed. A related object is to accelerate such motors at a smooth and even rate whereby no control pulses are lost owing to lack of coordination between the motor response capabilities and an occurrence of drive pulses.

In accordance with one aspect of this invention, a numerically controlled positioning table is mounted for traverse in either or both of two ["X" or "Y"] directions. The table is driven in each direction by a separate stepping motor which rotates a feed screw by a fixed amount. Thus, each step of the motor drives the table over a fixed distance of traverse. That is, an X-motor drives the table in an X-direction, and a Y-motor drives the table in a Y-direction.

Before the table begins to move, data is read-out of any suitable input (such as perforated tape, manual switches, or the like) and stored in two counters, one for the X-direction and one for the Y-direction. Thereafter an automatic pulse source drives each of the stepping motors at either fast or slow speeds depending upon the distance to travel. As they rotate on each step, the motors cause the generation of a signal pulse which is fed back to electronic logic circuits. These signal pulses drive the counters a step at a time back toward their zero positions. When the counters count down to zero, the table is in position and stops. Thereafter, the machine tool executes any task that it is capable of performing. After completion of its work cycle, the machine tool signals the table controls, and the table is moved to a new location.

In keeping with yet another aspect of the invention, electronic circuits generate drive pulses which reduce the electrical loading on the motors, conform to the acceleration characteristics of the motors, and provide peak power which coincides with the motor's power needs. A result is that the stepping motors are driven five or more times faster than the speeds which were heretofore considered to be their upper limits.

The above mentioned and other features of this invention and the manner of obtaining them will become more apparent, and the invention itself will be best understood by reference to the following description of an embodiment of the invention taken in conjunction with the accompanying drawings, in which:

FIG. 1A is a fragmentary cross section of an exemplary table showing how the drive mechanism may operate;

FIG. 2 is an exemplary section of perforated tape used to control the table position;

FIG. 3 is a block diagram of the electronic circuitry used to control the table;

Figure 11:
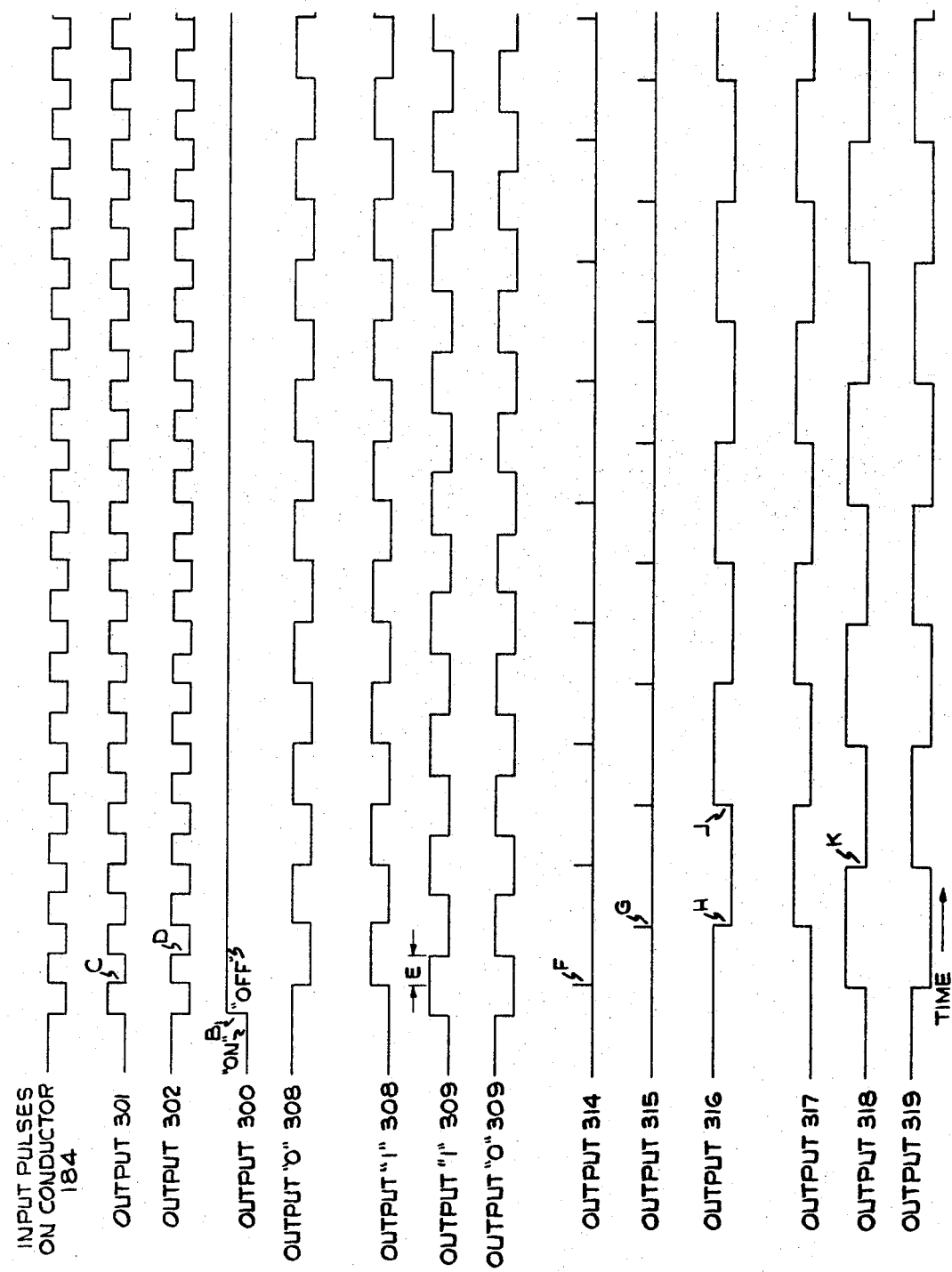

FIGS. 4–7, when joined, constitute a logic circuit diagram which shows portions of the electrical controls for the positioning table;

FIG. 8 is a layout diagram which shows how FIGS. 4–7 should be joined;

FIG. 9 shows a schematic circuit diagram for an electronic motor speed control;

FIG. 10 is a schematic circuit diagram which shows how the translator converts the drive pulses produced by the FIG. 9 circuit into pulses for driving a stepping motor; and FIG. 11 is a series of curves showing how pulses produced in the translator help accelerate and control the motor.

While the invention is primarily contemplated for use with a simple and inexpensive table which may be added as an applique to existing equipment, the appended claims are not to be constructed as limited thereto. Quite the contrary, the invention will find use almost any time that numerically controlled positioning is required. Thus, the claims are to be construed as broad enough to cover the full range of equivalents allowed under the patent law.

GENERAL DESCRIPTION

Figure 1:
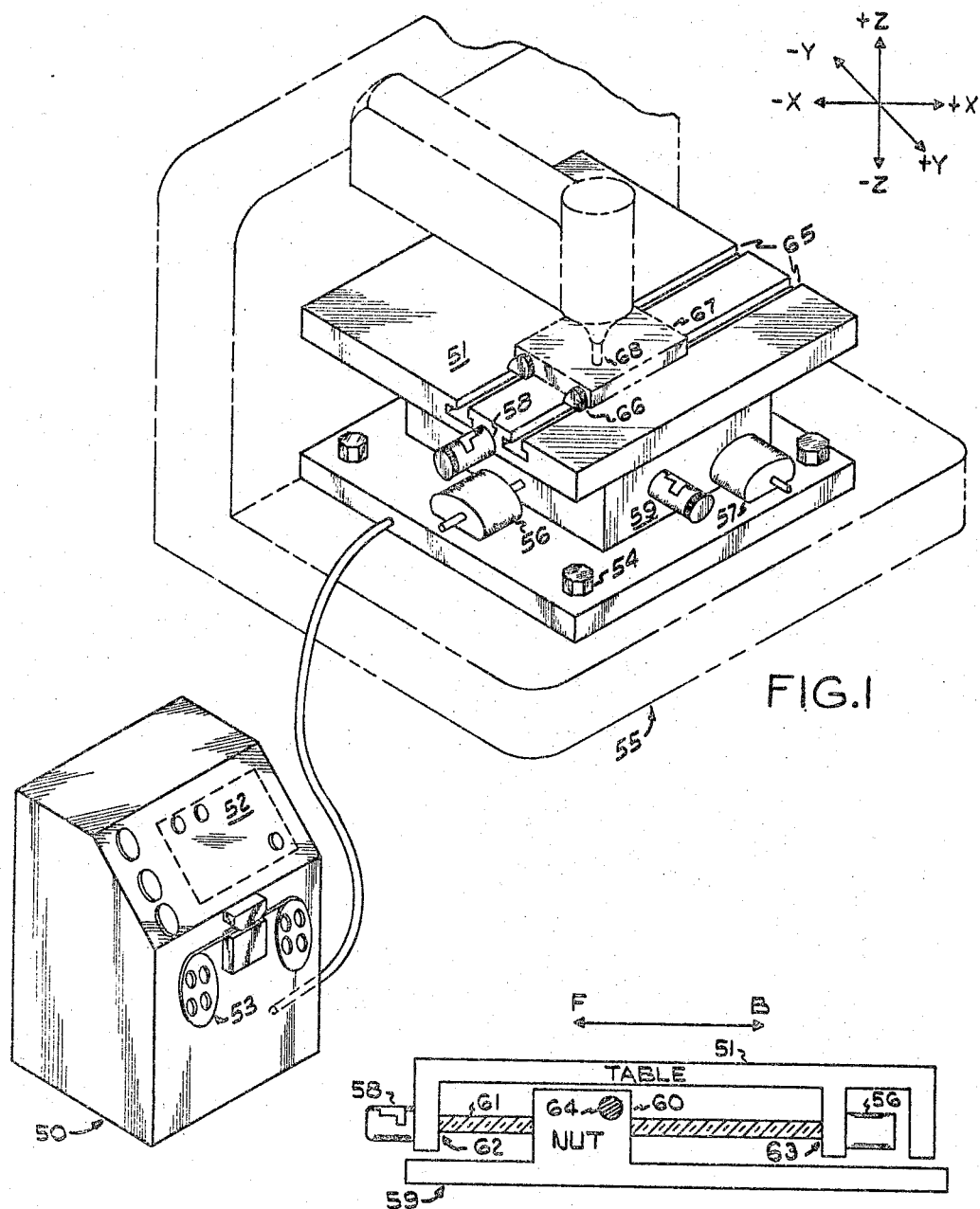
FIG. 1 shows an exemplary, numerically controlled positioning table which incorporates the principles of this invention.

FIG. 1 shows a console 50 which converts stored data information into signals for driving a numerically controlled positioning table 51. The console includes manual control devices 52 for either operating the machine directly or storing numerical data in a suitable storage media. Alternatively, the machine may be driven responsive to data stored in a storage medium 53 which could be perforated tape, for example.

Preferably, the table 51 is a completely self-contained unit adapted to be bolted (as at 54) or otherwise fastened to any suitable machine tool 55. The machine tool is here shown by dot-dashed lines and a stylized configuration to indicate that the table may be used with any convenient form of machine tool, especially with widely used, conventional, general purpose machine tools. In fact, the table may be used any time that numerical positioning is required—with or without an associated machine tool.

As here shown, the table is adapted to move in either or both an X-or a Y-direction. Of course other motions, such as rotation, are also contemplated. Here the table is driven back and forth in the X-direction by a first stepping motor 56 and in the Y-direction by a second stepping motor 57. In one exemplary construction, the motor is a commercial product sold under the trademark "Slo-Syn," model SS–50–1009 or SS–5D–1010. Each step of each motor drives the table a fixed distance (one ten-thousandths of an inch, for example) in the indicated direction. Vernier scale reading heads (such as 58) give a continuous reading of the table position. This is helpful when making zero setting or checking the table operations.

In FIG. 1, the motors 56, 57 and position indicators are shown in fanciful locations to indicate their presence and explain their functions. In reality, there are many different ways of assembling the motors and indicators. Those skilled in the art are expected to select the best configurations for any given installation.

However, in keeping with one aspect of the invention, the cost of the table may be reduced by eliminating all mechanical gearing. The gear function is then provided by electronic controls sometimes called herein an "electronic gear box." In greater detail, the table 51 (FIG. 1A) is mounted on guide ways (not shown) for giving motion in either direction, here arbitrarily designated "F" (forward) and "B" (backward). The pedestal 59 of the table carries a nut 60 having a feed screw 61 threaded therein. The two ends of the feed screw are rotatably attached at 62, 63 to the table 51. The stepping motor 56 is attached to the table 51 and connected to apply driving torque directly to one end of the feed screw 61. The position indicator 58 is attached to the other end of the feed screw. Each time that the motor 56 is pulsed, the feed screw 61 makes one increment (e.g. a 1.8° advance) of rotation, and the table 51 travels one increment of distance laterally. The motor is reversible. Thus, if it rotates the feed screw 61 in one direction, the table travels in the direction of the arrow (F). If it rotates the feed screw in an opposite direction, the table travels in the direction of the arrow (B). Regardless of which way the table moves, the indicator 58 continuously gives a visual indication of the table location with respect to the table stops. The same is true of the Y-direction motor which is not shown, but which drives the feed screw 64.

Otherwise, the table is entirely conventional. The table top includes a number of channels 65 each having a cross section shaped somewhat like an inverted T for holding dogs 66 which lock a work piece 67 in position adjacent a working tool 68. Any function performed by the tool may be aptly termed a Z-direction motion.

Thus, briefly stated, the purpose of the numerical positioning table 51 is to support and move the work piece 67 to any desired position in the X- and Y-directions. Then, the machine 55 is commanded to operate in the Z-direction. After the machine completes its work cycle, it signals the console 50. Then additional data is read-out to drive the work piece to a new position in the X- and Y-directions, and the cycle repeats.

Data may be either manually written into the system at console controls 52 or automatically written into the system from the storage medium 53. The invention contemplates two ways of preparing the storage medium. One way is to pre-plan every move and then perforate (for example) a tape in accordance with the plan. Another way is to move the table to specific locations by pushbutton controls on panel 52. When the work piece 67 is observed in a desired location, a button is pushed on panel 52 and the tape is automatically perforated as a function of the actual table position. By way of example, FIG. 2 shows a block of data 69 recorded in one such storage medium. Here the medium is perforated tape having the EIA standard eight channels divided with five channels 70 above, and three channels 71 below a row of sprocket holes 72.

Before the block of data begins, a "delete" signal 73 commands the control console 50 to clear itself of all previously stored information. Next, a "tab" signal 74 causes the control console 50 to prepare to function. Then, a start signal 75 indicates that X-direction data is about to be read-out. The following block of information 76 tells where the table must locate itself in an X-direction—here each of the five holes is punched in a "10" code position to indicate an X-direction travel to a location 10.000 inches from a starting position. Finally, the perforation 77 indicates that the direction of table travel is (−) X—see the axis of reference in FIG. 1.

After all of the X-direction data is read-out, another "tab" signal 78 prepares the controls to store Y-direction data. Then comes the start signal, the desired Y-location identification, the direction of table motion, and finally an end-of-block (EOB) signal. The EOB signal stops the tape transport mechanism and commands the start of table motion. The end of table motion commands the machine tool to operate; for example, tool 68 (FIG. 1) may then make a hole in a work piece 67—no effort is here made to indicate the Z-motion control signals on the tape. Completion of the tool operation, starts the advance of table positioning, the tape transport mechanism. Signal 79 then commands deletion of the data stored responsive to the perforations between tab signal 74 and the EOB signal.

The general concepts of the circuitry for controlling the table may become more apparent from a study of FIG. 3. Before the table can begin to move, data is read-out of any suitable input which may be either the manual controls 52 or the tape 53. If the machine is operating in a tape mode, a programmer 80 controls the manner in which the tape is read-out. In either the manual or tape mode, the read-out of data starts when the machine 55 (FIG. 1) closes control contacts 81 to send a start signal. Responsive thereto, either the manual circuit or tape reader sends numerical information into a data processing circuit—here designated "Reader-Recorder Control Circuit" 83. There the information goes through a parity check and any recognition, acknowledgment, or other functions.

After the parity check and any other data processing, the circuit 83 transmits the data through a sequence switch 84 for storage in two counters 86, 87. The counters 86, 87 store indications relative to the X-direction and Y-direction (respectively) motions. Thus, the sequence switch 84 first connects circuit 83 to a first storage tank 88 in counter 86 for storing the most significant digit of the X-direction motion. Next the switch 84 connects circuit 83 to the next most significant X-digit storage tank 89 in counter 86. In like manner, all X-direction digits are stored in counter 86. Then the Y-direction digits are stored in counter 87, a digit at a time, under the control of the sequence switch 84. Finally, the sequence switch signals the machine control circuit 90 that all data is stored in the counter. The machine prepares to operate and then signals a logic control circuit 91.

A pulse control circuit 92, 93 for each direction of table travel contains a suitable, two speed, pulse source such as a controlled, free-running multivibrator, for example. For example, the X-pulse control source 92 drives the X-direction stepping motor 56. On each pulse, the motor turns and causes a pulse which drives the X-counter 86 via wire 94. The X-counter circuit 86 counts down toward zero as the motor steps. When counter 86 reaches zero, the table is in position and the X-direction motor stops. Simultaneously circuit 93 pulses the Y-direction motor 57 in a similar manner. A pair of translator circuits 95, 96 convert the drive pulses from sources 92, 93 respectively into pulses which drive the motor. These translators are very important, especially when the motor operates at its fast stepping speed. The table positioning machinery (i.e. feed screws, etc.) is logically shown at 97.

The circuits 98 are two lamp banks which visually inform the machine tool operator of all functions.

DETAILED DESCRIPTION

Figure 4:
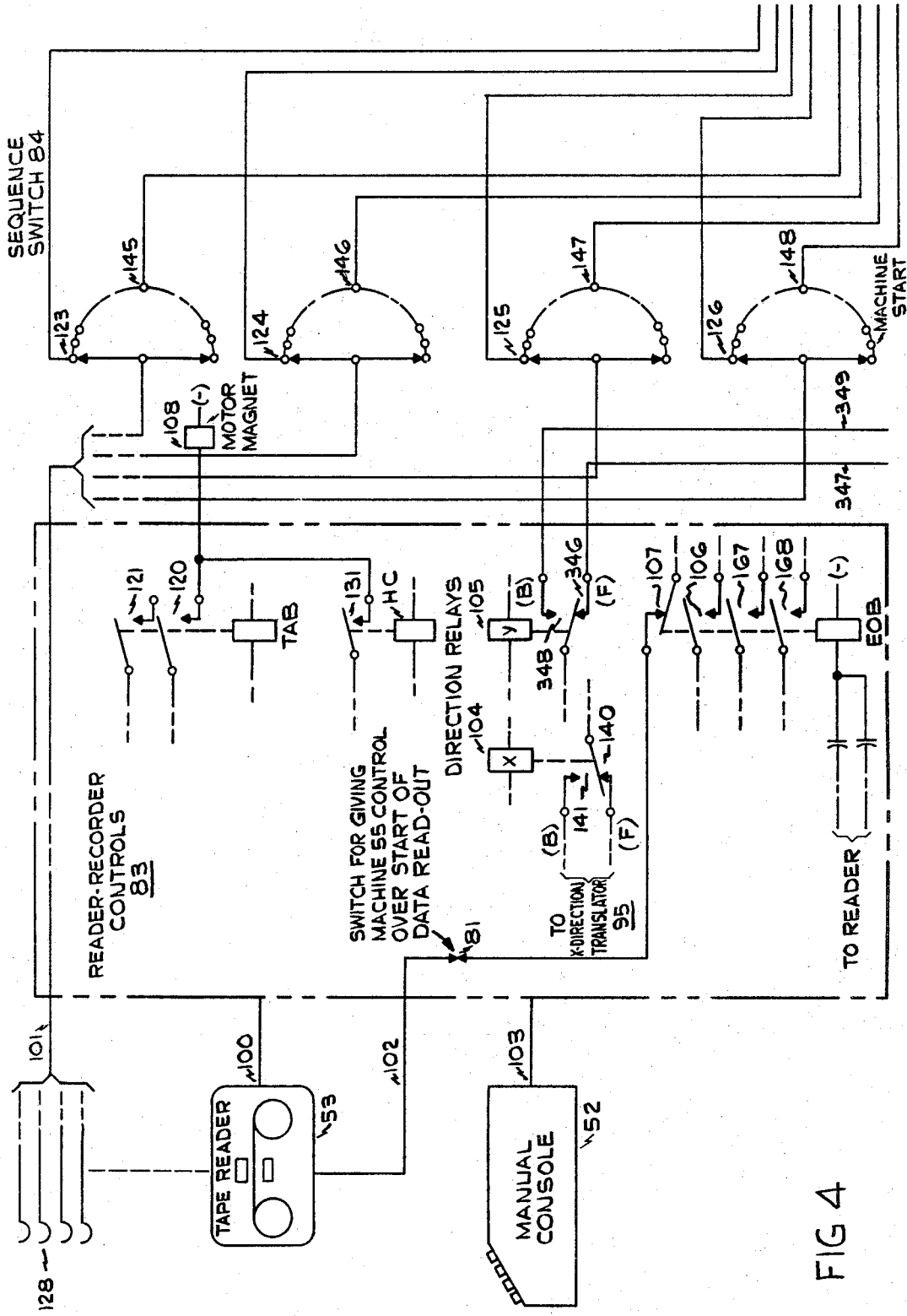

The details of the invention will become more apparent from a study of FIGS. 4–7 when joined as shown in FIG. 8. To orient the reader, FIG. 4 shows the pertinent parts of the circuits which comprise the boxes 52, 53, and 83 of FIG. 3. FIGS. 6 and 7 show the counters and logic which comprises boxes 86, 87, 91, 92, and 93 OF FIG. 3. Finally, FIG. 5 shows the logic which comprises the boxes 95 and 96 of FIG. 3.

In FIG. 4, the tape reader and its transport mechanism are shown at 53. All data stored in and read-off the tape is forwarded to the control circuit 83 and sequence switch 84 over any convenient number of connections symbolically shown at 100 and 101. The tape transport mechanism causes the reader to read-out a block of information each time that the conductor 102 is energized. This conductor is energized by the machine tool when it is ready to receive the next block of information. The manual console 52 comprises a keyboard or group of dials for transmitting digital information over the conductors 103 to the control circuit 83. Both the reader 53 and the console 52 are any suitable devices and each transmits data in the same manner.

The block 83 contains much circuitry which is conventional, such as parity checking devices, for example. Those skilled in the art will readily perceive how these and many other similar circuits will be used. Thus, a few of the components which are shown in circuit 83 of FIG. 4 include a "tab" relay which operates responsive to perforations such as 74 (FIG. 2) at the start of each read-out of data relative to either an X- or a Y-location. An HC relay drives the sequence switch 84 while data is stored in the counters 86, 87. The X- and Y-directional relays 104, 105 are selectively operated by information stored on the tape, such as perforation 77, for example.

The EOB relay operates at the end of each block of data. Contacts 106 close to complete a circuit over which the logic circuits may command the machine tool to operate. Contacts 107 opens to prevent the machine tool from commanding the read-out of information before the circuits are prepared to receive such information. The remaining contacts on relay EOB cause table drive motors to operate.

The sequence switch 84 comprises a rotary stepping switch having at least four banks of terminals for distributing the data transmitted from the tape over wires 101. In addition, the switch 84 may include any number of other banks or terminals for control purposes. For example, one such terminal is marked "Machine Start" in the drawing. All wipers or brushes on switch 84 take one step, in unison, each time that motor magnet 108 is energized.

The X-counter 86 and Y-counter 87 are identical. Each contains a number of storage tanks or circuits corresponding to the number of digits in the command numbers which identify the X- or Y-locations. For example, in the tape of FIG. 2, each of the X- and Y-locations may have as many as six digits indicated by five sequential perforations 76, each perforation representing the number "10." In addition, a digit could be provided to indicate a fraction or a multiplier, if required. All storage tanks are the same except that the last need not contain an element for driving the next. Thus, by way of example, storage tank 111 shows four flip-flop circuits 112 for storing a count which may go up to $2^4$ or sixteen. In addition, tank 111 contains an AND gate 113 for driving the flip-flop circuits in tank 114 after the tank 111 has counted down to zero. On the other hand, the tank 114 does not contain an AND gate correspondent to the AND gate 113 since there is no other tank to drive.

Circuit operation

The remainder of the components are shown by well known symbols representing electronic logic circuitry. The functions of these circuits will be understood best from a description of how the circuit operates.

*Tape read-out.*—The circuit operations which follow begin with the read-out of a block of information. This occurs when the EOB relay is released to close the contacts 107 and when the machine tool closes contacts 81. First, the tape reader 53 reads-out the delete signal 73 (FIG. 2), and all circuits return to normal if they were not then normal. Next the tape reader reads-out the "tab" signal 74, and the tab relay operated in block 83. This closes contacts 120 to energize the motor magnet 108 and step the brushes of the sequence switch 84. It also closes the contacts 121 (FIGS. 4 and 6) to reset all counters to a normal or zero count.

*X-digit storage.*—On the first step of the sequencing switch 84, each brush rests on a corresponding one of the terminals 123–126. These terminals connect directly to the flip-flops 127 in the first storage tank 114. The first perforation in group 76 (FIG. 2) causes the brush 128 (FIG. 4) in reader 53 to energize the terminals 124 (via wires 101) and thereby set the flip-flop 129 in storage tank 114. As the flip-flop sets, it removes an input from an AND gate 130 which turns "off." This tells the control logic 91 that information is stored in tank 114. If other information were punched into the tape, other flip-flops in group 127 would, of course, be set also.

After the first or most significant digit is stored in the flip-flops 127, relay HC operates in block 83—the specific circuit for pulsing this relay is not important. When it operates, relay HC closes contacts 131 to energize the motor magnet 108. Then all brushes of the sequence switch 84 advance one step, and the next digit is stored in tank 111. In like manner, all other X-position digits are stored in the remaining storage tanks of counter 86. Of course, there are suitable interlocking circuits so that each digit is stored in its corresponding tank without interferring with digits previously stored in any other tank. Also, if any tank stores a digit, a corresponding one of the associated AND circuit turns "off" so that AND circuit 133 does not conduct if any digit is stored in any tank.

A "coarse" or fast drive rate is indicated if the AND circuit 134 does not conduct. Thus, if any digit is stored in tank 135 (and therefore in either of the tanks 111 or 114), the table moves at a coarse or fast rate of speed. On each increment of table motion, the counters are driven one step in a count down to zero. When the table reaches a point near its final location, the tanks 114, 111, 135 have counted down to zero and are emptied. The AND circuit 134 conducts, and the table slows to a fine or slow rate of speed. Then the remaining three tanks are driven a step at a time in a count down to zero.

*Direction control.*—When perforation 77 is read-out, relay 104 (block 83, FIG. 4) operates or remains unoperated depending upon the desired direction of table travel along the X-axis. If contacts 140 are closed, the table moves one way along the X-axis. If contacts 141 are closed, it moves an opposite direction along the X-axis. Arbitrarily, F means "forward" and B means "backward." Either F or B could be the (+) direction on the axis of FIG. 1.

Next the tape reaches a "tab" signal 78 (FIG. 2) which operates the "tab" relay in block 83 (FIG. 4). Contacts 120 close, and switch 84 steps once. Contacts 121 have no effect this time. The next perforation 142 tells the equipment that Y-direction data is about to be read out.

The brushes of sequencing switch 84 now stand on terminals 145–148. When the first Y-direction data is read-out, selected ones of the four flip-flops in tank 150 (FIG. 7) are set to indicate the most significant Y-direction digit. Then relay HC (FIG. 4) operates in any suitable manner, and the sequence switch brushes advance to store the second most significant Y-direction digit in tank 151. In like manner, each succeeding Y-direction digit is stored in the next succeeding one of the tank circuits 152–155. Again, as each digit is stored, a corresponding one of the AND circuits 156–161 turns "off." The AND circuit 158 commands a "coarse" or fast drive rate in the Y-direction.

*Stop control.*—Means are provided for stopping the table motion in either direction when the counter counts down to zero. More particularly, each AND gate—such as 130—conducts when the associated tank is empty. When circuit 133 conducts again, it means that all of the storage tanks are empty, the counter has counted down to zero, and the table is in position in the X-direction. Thus, relay 136 operates responsive to the output of AND gate 133, and contacts (not shown) open or close to stop the X-motor. A similar arrangement for stopping the Y-motor is shown at 163, 165 (FIG. 7). Thus, the motor of any direction starts, moves fast, moves slowly, or stops independently of motion in any other direction.

*Logic circuitry.*—As long as any of the tanks store data, it means that the table is not in the desired position. Logically this is indicated if the AND circuits 133, 163 are "off." Moreover, if AND circuit 134 is "off" the table should move at a fast speed in the X-direction, and if AND circuit 158 is "off," the table should move at a fast speed in the Y-direction. Conversely, if either of these circuits 134, 158 is "on," the table should move at a slow speed in the indicated direction.

Means are provided for commanding the table to begin its motion toward the desired location. In greater detail, responsive to the storage of the numerical data, the AND circuits 133, 163 switch "off," and the lowermost brush of the sequence switch 84 reaches a "Machine Start" position. Since the response in the X- and Y-directions are identical, only the Y-direction will be described in detail.

Relay 165 releases when AND circuit 163 switches "off," and the end-of-block relay EOB (FIG. 4) releases responsive to the EOB perforation on the tape. Then, contacts 107 close, maybe without effect because contacts 81 may be open. Contacts 167 (FIG. 6), 168 (FIG. 7) close to complete paths in the logic circuit 91. For example, contacts 168 start a free-running multivibrator 172 in the Y-direction speed control circuit found near the bottom of FIG. 7. The free-running multivibrator 172 immediately begins pulsing out over wires 174. The pulses recur rapidly if the table is to move at the fast rate and slowly if it is to move at the slow rate.

Assume that multivibrator 172 is marking wire 174. If the machine is in a condition which allows it to move, wire 94 is not marked, and gate 176 conducts.

MOTOR SPEED CONTROL

As here used, the "Slo-Syn" stepping motor which drives the positioning table is capable of relatively high stepping speeds. However, to reach such high stepping speeds, care must be taken to observe an acceleration pattern which is limited by the acceleration capability of the motor. Thus, a desired motor speed control circuit starts the motor slowly and increases its speed along a predetermined acceleration curve until the motor reaches its maximum speed. The circuit for controlling this motor acceleration is broadly shown in FIG. 7 by the logic circuitry enclosed within a dot-dashed rectangle 187. The same circuit is shown in detail in FIG. 9.

As will become more apparent, a variable impedance, such as a bank of capacitors, is used to establish the desired acceleration pattern. Normally, the charge on the bank of capacitors floats at a threshold potential which is just less than a level required to command acceleration. Almost instantaneously, after a fast speed command signal is received, the charge on the bank of capacitors exceeds the threshold level, and the motor begins to step slowly. Then, the motor accelerates as the bank of capacitors charge over a period of time established by the RC characteristics of a network including the bank. When the bank is fully charged, the motor runs at its high speed. This way the RC network may be designed to meet the motor needs. Of course, other variable impedance devices may be used also.

In greater detail, if any numerical data is stored in any of the counter tanks 150–152 (FIG. 7), the AND circuit 158 does not conduct which means that the inverter 188 does conduct and mark conductor 190. The diode 189 prevents any output of AND circuits 156, 157 from feeding back to switch "off" the inverter 188. If the table is closer than a predetermined distance from its mechanical stops in the commanded direction of motion, limit switch contacts 191 are open to prevent the output of inverter 188 from reaching an isolation gate 192. Under these conditions, the table can be driven in only its slow speed even though a fast speed might otherwise be indicated. On the other hand, if the table is more than the predetermined distance from its mechanical stops, the contacts 191 are closed, and isolation gate 192 does conduct responsive to the output of the inverter 188. This starts a first timer 193. After a period of time, the timer 193 conducts and starts a second cascade connected timer 194. The timer 194 includes the variable impedance speed control—here described as a bank of capacitors having a charging curve which matches the acceleration curve of the stepping motor.

While this bank of capacitors charges, a driver 195 increases the speed of the free-running multivibrator 172. The circuit including diode 196 is part of a response control circuit which helps to maintain the threshold charge on the capacitor bank in timer 194 just beneath the high-speed command level. Normally, the multivibrator 172 runs at a fixed, slow speed which drives the stepping motor at a corresponding fixed, slow speed. However, as the capacitor bank charges in timer 194, the driver 195 sends an analog signal over wire 197, and the free-running multivibrator 172 speeds up progressively at the desired rate of acceleration. As the multivibrator accelerates and produces pulses at a faster rate, the stepping motor accelerates at the same faster rate. The speed of the table drive is also increased at a corresponding acceleration rate. Thus, broadly stated, the object of the circuits in block 187 is to build the motor speed along a desired acceleration curve which exactly matches the motor capability (with due regard for reliability).

FIG. 9 shows in detail the electronic circuitry which provides the functions indicated logically by the components in dot-dashed rectangle 187 of FIG. 7. To orient the reader, FIG. 9 is divided by dot-dashed lines which correspond to the logic symbols of block 187, and the same reference numerals identify the same parts in both figures. The fast speed control signals from inverter 188 are received by the gate circuit 192 shown in the lower left-hand portion of FIG. 9. When the inverter 188 energizes the wire 190 with a negative potential, a fast speed is indicated. When the inverter energizes this wire with a ground potential, a slow speed is indicated.

The gate circuit 192 comprises a PNP junction type device which may be a transistor 200 operated as a large signal amplifier. Its base is energized by a circuit comprising a pair of resistors 201, 202 and a capacitor 203. When wire 190 is at a ground potential, resistors 201, 202 form a voltage divider for switching transistor 200 "off." When wire 190 is at negative battery, the resistors 201, 202 form a voltage divider for switching the transistor 200 "on." The capacitor 203 provides an A.C. short circuit to ground for suppressing transients. When the transistor 200 is "off," its collector 206 stands at the negative potential of battery B1 applied through a load resistor 208. When the transistor 200 switches "on," the collector 206 stands at the potential of ground G1. A resistor 209 limits current and couples the transistor 200 to the next stage which is the first timer 193.

The timer 193 comprises two PNP junction type devices 210, 211, which may also be transistors operated as large signal amplifiers. Normally, both of these transistors are "on" before a high speed command signal is received. The emitters of both transistors are biased from a voltage divider 212.

A Zener diode 213 stabilizes the voltage divider 212. Those skilled in the art will readily perceive how a reversed biased Zener diode, such as this, operating above its breakdown point uses an electron multiplication phenomenon to maintain a constant voltage. This stabilization voltage is extremely important because it fixes a threshold charge maintained upon the bank of capacitors prior to the receipt of a fast speed signal. After receipt of this fast speed signal, the stabilized voltage fixes the rate of capacitor charging to provide the acceleration curve. In greater detail, the voltage divider comprises a network of resistors connected between a (—) 18 v. battery B2 and a source of ground G2. Of these, the resistor 214 is a Zener diode load for conducting a maintenance current after the diode breaks down. The resistors 215–217 form a voltage divider for establishing the emitter potentials on the transistors 210, 211, and base bias for transistors in driver 195. The adjustable resistor 218 provides a fine adjustment of the potential applied to the bank of capacitors.

The remaining components in the timer 193 are a load resistor 219 for the transistor 210 and a pair of coupling resistors 220, 221 for limiting current and providing input signals to the next equipment.

The acceleration curve is provided by a device having a variable impedance (here shown as a bank of capacitors 225) in the second timer 194. The left-hand side (as viewed in FIG. 9) of this bank of capacitors is coupled to timer 193 via a current limiting and isolating resistor 226. The right-hand side of this bank of capacitors is energized from a voltage divider 227. To control the polarity of voltages on the capacitor bank 225, a diode 228 is connected between the left-hand side of bank 225 and ground. Normally, this diode is back biased and has no appreciable effect upon the circuit. However, if the left-hand side of the capacitor bank becomes positive, as when a transient spike occurs, the diode 228 is forwardly biased so that it conducts. This way, the left-hand side of the bank 225 can not become more positive (with respect to ground) than the approximately one-half volt drop across the diode 228.

The principal components of the driver circuit 195 are a PNP and two NPN junction type devices 230–232 respectively. Of these, the transistor 230 conducts and transistors 231, 232 are "off" before the receipt of a fast speed signal. After the receipt of such a signal, transistor 230 switches "off" and transistors 231, 232 switch "on" at a rate of speed fixed by the charging of the capacitor bank 225. A voltage divider 233 provides the emitter bias for the transistor 230. A resistor 234 limits current and couples timer 194 to driver 195. A resistor 235 provides base bias for transistor 230. A pair of voltage dividers 236, 237 provide the emitter bias for the transistors 231, 232. A pair of diodes 238, 239 clamp the base to emitter potential difference of the transistors 231, 232 to protect the base-emitter diode against excessive voltages which might otherwise damage the semiconductor material. The base bias for the transistors 231, 232 is taken from the voltage divider 212. The driver output is a voltage appearing on the collectors of the transistors 231, 232; the effect of this voltage may be adjusted by the potentiometers 240, 241 which resistively couple the driver 195 to the multivibrator 172.

In essence, the multivibrator 172 is conventional in design. Two transistors 250, 251 are biased so that each turns the other "off" and "on" at a rate fixed by the charging and discharging time of the capacitors 252, 253. Thus, in a normal condition (no potential on conductors 197), cyclically recurring pulses appear on conductor 174 at a relatively slow repetition rate fixed by the time constant of an RC network comprising the capacitors 252, 253. As will become more apparent, an appearance of a potential on the conductors 190 changes the free-running speed of the multivibrator 172 by varying the charging and discharging time of the capacitors 252, 253.

One unique feature of the multivibrator resides in the use of the transistors 254, 255. In many machine shops, the ambient temperature is subject to wide fluctuation. Thus, a temperature stabilizing circuit is desirable. To insure that this stabilization circuit provides changes which are completely complementary to the thermal change in the transistors 250, 251, the base bias is applied from battery B3 to those transistors via the base-collector diodes of transistors 254, 255 which are the same type as the transistors 250–251 and are selected to have matching thermal characteristics.

*Operation.*—The circuit of FIG. 9 operates this way. First, assume that a quiescent condition exists before the receipt of a fast speed command signal. Conductor 190 stands at ground potential. Transistor 200 is "off" and the base of the transistor 210 is energized from a voltage divider including the resistors 208, 209, diode 196, transistor 230, and the voltage divider 233. For the moment, we will simply state that the transistor 210 is "on"; however, as we shall learn, the circuits actually 193–194 oscillate. Thus, it may be helpful to discuss operations in terms of specific circuit values and voltages. These values and voltages are those actually used and observed in an exemplary circuit that was built and tested; however, the citation of these values and voltages should not be construed as limiting the invention.

The voltage at the base of transistor 210 depends upon the instantaneous output of the transistor 230. Thus, let us begin our specific analysis of certain values at the latter transistor. The resistors 234, 235 are 1K and 33K respectively and fix the RC time constant of the second timer circuit 194. The upper and lower resistors of voltage divider 233 are 33K and 82Ω respectively. The voltage at point P1 can swing between (—) 2.5 v. and (+) 0.5 v. while the voltage at point P2 can swing between (—) 2 v. and (—) 11 v. The multivibrator 172 holds its low speed, cyclic operation when the point P2 is less negative than (—) 4.3 volts. If the point P2 becomes more negative than (—) 4.3 volts the multivibrator begins to speed up. Thus, before a fast speed signal is received the objective of the FIG. 9 circuits is to hold point P2 less negative than (—) 4.3 volts, preferably about (—) 2 volts.

One way to hold point P2 less negative than (—) 2 volts is to saturate the transistor 230. Unfortunately this is too unsophisticated for practical applications since the capacitor bank will charge, and several seconds are then required after the receipt of a fast speed signal to discharge on the capacitor bank to the threshold level where the motor begins to speed up. Thus, the table motion would respond too slowly to be of real use. Therefore, as a practical matter the transistor 230 must not be allowed to go into saturation at this time. The converse is also true, the transistor 230 must not be allowed to switch "off" because the motor would try to move instantaneously from a standstill to its fastest speed, and it would stall.

To prevent saturation of the transistor 230, the current through the transistor 211 must be controlled. That, in turn, means that the current through the transistor 210 must be controlled as a function of the voltage at point P2. This returns us to our point of departure, the control over the bias on the base of transistor 210.

Means are provided for holding a quiescent charge on the capacitor bank 225 at a threshold value to insure a quick response to the receipt of high speed command signals. More particularly, if the point P2 is negative with respect to the base of transistor 210, the diode 196 is back biased. The emitter of transistor 210 is about (−) 2.6 volts. As the potential at the base of transistor 210 moves toward the (−) 18 volts of battery B1, the base becomes relatively more negative than the (−) 2.6 volts on the emitter. The transistor 210 conducts a heavier current. This makes the transistor 211 conduct a heavier current, and more current flows from the voltage divider 212 through the transistor 211 and the resistors 221, 226 to charge the capacitor bank 225.

The increased charge on the capacitor bank 225 makes point P1 more negative, thus increasing the negative bias on the base of the transistor 20. The transistor 230 moves toward saturation, and point P2 moves toward the ground potential G3. When the point P2 reaches about (−) 1.5 volts, it becomes positive relative to the base of of the transistor 210, and diode 196 conducts. The base of the transistor 210 moves toward (−) 1.5 volts. Since the emitter of transistor 210 is about (−) 2.6 v., it starts to cut "off" and conduct less current. This tends to cut "off" the transistor 211.

The charging current to the capacitor bank 225 reduces when the transistor 211 begins to cut "off." Then the charge on the capacitors begins to leak off through point P1. When this occurs the voltage on the base of the transistor 230 changes, and it conducts less heavily. The potential at the point P2 goes toward the (−) 18 volts applied through the resistors 236, 237. Soon the relative voltages are such that the diode 196 is again back biased. This terminates the positive voltage feedback to the base of transistor 210 which again conducts heavily to repeat the cycle.

The oscillatory nature of the circuit should now be apparent. The voltage on the collector of the transistor 210 tends to follow a sine wave form 260. The current through the transistor 211 is a series of current pulses of wave form 261 which hold the charge on the capacitor bank 225,at the desired threshold level. The potentiometer 221 is adjusted so that the pulse repetition rate falls within the range 150–400 k.c. with a nominal rate of 250 k.v. in one exemplary system. From the foregoing it is seen that the charge on capacitor bank is held constant at a threshold level during quiescent periods which are either when a slow table speed is desirable or when the table is stopped.

Means are provided for giving a fast response to increase the table speed responsive to the receipt of a fast speed signal. More particularly, a fast table speed is commanded when information read-off the perforated tape causes the inverter 188 to energize the wire 190 with a negative potential. The transistor 200 switches "on" and saturates because its base goes negative relative to its emitter. Thus, the potential of ground G1 replaces the potential of battery B1 at the base of transistor 210 which turns "off." This, in turn, switches "off" the transistor 211, and the charge leaks off the capacitor bank 225 at a rate fixed by the RC constant of the circuit. Since the circuit oscillations hold this charge near a critical value, the leakage causes the capacitor charge to a very quickly fall below the threshold level.

The transistor 230 turns "off" with its conduction falling at a rate fixed by the discharge of the capacitor bank. This means that the emitters of the transistors 231, 232 begin to go negative, and they begin to conduct more heavily. This begins to change the time constant of the RC network in the multivibrator 172. The rate of this change is such that pulses begin to appear on conductor 174 at an accelerated repetition rate. Thus, the stepping motor and the table begin to move at the same accelerated rate until the table reaches its fast speed.

TRANSLATOR

The manner in which the pulses on conductor 174 control the stepping motor may become more apparent from a study of the logic drawings of FIGS. 5 and 7. Two such motors are shown (FIG. 5), one 56 for the X-direction and one 57 for the Y-direction. Each motor turns a feed screw 61, 64 which drives the table in the indicated direction. The motors are, in turn, controlled by their respective translators. The "X-Direction Translator" 95 controls the X-motor 56, and the "Y-Direction Translator" 96 controls the Y-motor 57. Since both translators are identical, only the Y-direction translator is shown in detail.

The pulses on conductor 174 (FIG. 7) cause the "Ratio Divider" circuit 181 to send pulses over conductor 184 to the "Y-Direction Translator" circuit of FIG. 5 while it also sends pulses over conductor 183 to cause the counter 87 to count down toward zero. In FIG. 5, an inverter 300 and two amplifiers 301 and 302 respond to each pulse appearing on conductor 184. The inverter 300 is part of the circuit for controlling the direction in which the motors turn. The amplifiers 301, 302 function as pulse shapers, drive bistable or flip-flop circuits 308, 309 respectively, and provide drive command pulses.

Electronic gear and clutch equivalents are provided by the flip-flops 308, 309. As will become apparent, the pulses from flip-flop 308 drive the motor, and therefore the table. The flip-flop 309, in association with inverter 300, functions somewhat as a clutch by inhibiting drive pulses while the translator presets itself to a normal condition prior to the receipt of the next control signals.

The drive and clutch effects are transmitted toward the motor via four inhibit gates 303–306. These four gates are used to insure proper phase relations of the pulses applied to the windings of the motor. The gates 303, 304 drive into an OR gate 310 while the gates 305, 306 drive into an OR gate 311. These OR gates drive associated flip-flops 312, 313 via inverters 314, 315, respectively. The combination effects of circuits 310–315 is such that virtually no loading appears at the outputs of the inhibit gates 305–306. Thus, the drive flip-flop 308 runs at an extremely fast rate of speed because it has almost no load. The outputs of the flip-flops 312, 313 are fed to the motor 57 via amplifiers 316–319. These amplifiers are very important and are explained in detail in FIG. 10. They shape the pulses and provide the power required to drive the motor. They also function as a buffer to prevent the motor from loading the electronic circuits. This buffer action increases the stepping speed of the motor by decreasing the control circuit response time. All of these amplifiers 316–319 functions combine to provide motor stepping speeds much greater than the highest stepping speeds heretofore available from such motors.

Means are provided for sensing when the motor takes a step and then commanding the motor to take another step. More particularly, the "Slo-Syn" motor 57 contains the usual drive windings 325–328 which rotate the feed screw 64 one step when they are energized. The feed screw 64 is coupled to turn a shaft 320 one increment of rotation each time the motor 57 turns. The shaft carries a plate 321 which is designed to chop a light beam 322 falling on a photocell 323 and thereby generate one pulse responsive to each increment of rotation of the shaft 64. If the amplifiers 316–319 energize the windings 325–328 and if the motor does in fact rotate, a signal is generated in the photocell 323 to pulse the inhibit gate 176. On the other hand, if the amplifiers 316–319 pulse the windings 325–328 and further, if the motor does not rotate, no signal is generated and the gate 176 is not pulsed. Thus, the signal resulting from the light chopper 321 is a feedback signal positively related to table motion. This signal turns "off" inverter 335 to remove an inhibit from gate 176 and allow the output of the free-running multivibrator 172 to reach the "Pulse Control and Wave Shaper" circuit 92. The "Ratio Divider" circuit 181 pulses the counter 87 to subtract one unit of count (either an integer or a fraction of an integer, depending upon circuit needs) and pulses the translator 96 to command the motor to take another step.

Alarm and motor stop signals may be given if the motor fails to turn. That is, when the amplifiers 318, 319 pulse the motor windings 327, 328, a pair of timers 337 start. If the motor turns, a signal from the light chopper 323 inhibits the timers 337 before they time out. Then nothing further happens. On the other hand, if the motor does not turn, the timers 337 do time out and send signals for stopping the machine and giving an alarm.

An electronic equivalent to a mechanical gear is provided by the components enclosed within the dashed lines 340 of FIG. 5. Of these, drive 308, the clutch 309, and their associated gates have already been explained. The remaining components shown inside the dashed rectangle 340 are used to control the direction of drive. In greater detail, normally the circuits inside the box 340 are conditioned to drive the table in one direction after each command is executed. If the tape reader 53 or manual console 52 send signals to the control circuit 83 which indicate that the table must travel in a reverse direction, relays 104, 105 operate to send signals to the logic circuitry of the electronic gear box 340 which command the motor to reverse direction.

*Operation.*—The electronic gear box 340 works this way. Before a drive pulse appears on conductor 184, the inverter 300 is "on," the amplifiers 301, 302 are "off." The output of inverter 300 passes through the diodes 342 to inhibit each of the gates 303–306. This prevents any simulation of drive pulses from reaching the motors. The output of inverter 300 turns "off" inverter 343 to enable a selection of the direction in which the table will next move. If the table is to move in a forward Y-direction, contacts 346 (FIG. 4) are closed, and conductor 347 is energized. If the table is to move in a reverse Y-direction, contacts 348 are closed and conductor 349 is energized.

Next, assume that the first drive pulse in a read-out series appears on conductor 184. Inverter 300 turns "off"; diodes 342 stop conducting and remove the inhibit from gates 303–306. Also, inverter 343 turns "on" and inhibits a gate 363 to prevent any change in direction during table motion. Amplifiers 301, 302 pulse the flip-flops 308, 309 to drive the table. The timing of the flip-flops 308, 309 is illustrated by curves 350, 351. That is, both flip-flops provide output pulses having the same pulse period, but the pulses from the flip-flop 308 lead the pulses from the flip-flop 309 by one-quarter pulse period.

Assume that both flip-flops 308, 309 initially stand on their "1" side. Flip-flop 308 enables gates 303, 304 while flip-flop 309 inhibits gates 303, 305. Thus, gate 304 conducts. Next, flip-flop 308 switches to its "0" side to enable gates 305, 306 while flip-flop 309 inhibits gates 303, 305; gate 306 conducts. Next, flip-flop 309 switches to its "0" side to inhibit gates 304, 306; gate 305 conducts. Finally, flip-flop 308 returns to its "1" side to enable gates 303, 304 while flip-flop 309 inhibits gates 304, 306; gate 303 conducts. The cycle repeats endlessly as long as pulses recur on the conductor 184. Thus, there is a four step drive cycle. The OR gate 310 conducts in a precisely timed relation with respect to the output of flip-flops 308, 309 (curve 352) when either of the gates 303, 304 conduct, and the OR gate 311 conducts in a similar timed relation when either of the gates 305, 306 conduct. It is thought that those skilled in the art will understand this action from a study of curves 350–352.

The flip-flops 312, 313 change state to drive amplifiers 316–319 each time that the OR gates 310, 311 conduct. The primary purpose of this action is to energize the motor windings. Additionally, the outputs of these flip-flops 312, 313 drive a detector circuit comprising a pair of inhibit gates 360, 361, and an OR gate 362. Those skilled in the art will readily perceive that the operation of the flip-flops 312, 313 and gates 360–361 is described by the following:

TRUTH TABLE

| "0" side of flip-flop 312 | "0" side of flip-flop 313 | Output of OR gate 362 |
|---|---|---|
| 1 | 1 | 0 |
| 1 | 0 | 1 |
| 0 | 1 | 1 |
| 0 | 0 | 0 |

This "TRUTH TABLE" is selected because it corresponds to a characteristic of the "Slo-Syn" motor as it is used by this circuit. That is, when the motor stops if the states of the flip-flops 308, 312, 313 are known, it is possible to predict the direction in which the motor will turn when it is energized by the first pulse in the next pulse train.

Means are provided for always returning the various flip-flop circuits to a normal state, thus preparing the motor to turn in a given direction when it is energized by the first pulse in the next pulse train. For an understanding of this feature, assume first that the motor is to continue turning in a "forward" direction when the next series of pulses is received. Assume also that the OR gate 362 is in a "0" state (not conducting) at the end of a previous train of drive pulses. Inverter 300 is "on"; inverter 343 is "off"; gates 303–306 are inhibited; gates 363, 364 are not inhibited. Because gate 362 is "off," the inverter 365 conducts to enable the gate 363. The Y-direction relay 105 (FIG. 1) is in the condition shown either because a new block of data has not been read off the perforated tape or because the next block of data has been read and a "forward" direction Y-motion is indicated. Contacts 346 are closed; conductor 347 is energized. The AND gate 365a conducts, and flip-flop 308 resets to its "1" side. Any pulse occurring responsive to this reset has no effect at the motor 57 because the gates 303–306 are inhibited by the voltage applied from inverter 300 through diodes 342. The output of AND gate 365a energizes the NOR gate 364 to prevent it from turning "on" when inverter 343 turns "off."

Next, assume that the previous series of pulses ends with the flip-flops 308, 312, 313 in conditions such that the motor 57 will resume a "forward" direction when next pulsed only if the flip-flop 308 is switched to its "0" side. The OR gate 362 is now in its "1" state and conducts. Inverter 365 is turned "off." Gates 363, and 365a do not conduct so that no reset signal reaches the "1" side of flip-flop 308. Also, since the inverter 365 is "off," the AND gate 365a does not conduct to energize the upper input of inverter 364 when the inverter 343 turns "off" to remove a signal from the lower input of NOR gate 364. Thus, the NOR gate 364 turns "on" and, the AND gate 366 conducts to reset the flip-flop 308 to its "0" side.

Under either of the above assumptions, the circuit stands readly to receive the next block of information from the console 52 or the tape reader 53 (FIG. 1).

Means are provided for advancing said flip-flop circuits to an off-normal state for reversing the direction of turning. In greater detail, as the circuit was described, the motor must turn in a forward direction when it is next energized via conductor 184. If it is, in fact, supposed to turn in a forward direction nothing further happens before the next drive pulse appears on the conductor 184. However, assume that the information read-off the tape indicates that the table is to run in a "backward" direction. The Y-direction relay 105 (FIG. 1) operates to close contacts 348 and energize pulse amplifier 367 (FIG. 7) via conductor 349. Amplifier 367 pulses once and drives the flip-flop 308 to the state opposite the state to which it was set by the action of the gates 365a, 366. Remember that this change of state of the flip-flop 308 has no effect on the motor 57 because the inverter 300 still applies an inhibiting voltage through the diodes 342 to gates 303–306. Now the flip-flops are in a condition such that the motor will drive in a "backward" direction when the next series of pulses is received.

Briefly in résumé, it is seen that the flip-flop circuits 308, 309 cause gates 303–306 to provide output signals which energize the motor windings 325–328 in a given sequence. When so energized the motor turns in a given direction. Before a train of pulses is received, the circuits 362–366 always prepare the flip-flop circuits 308, 309 to repeat the given sequence for turning the motor in the given direction responsive to receipt of the next pulse train. If the motor is to reverse direction, the flip-flop circuits 308, 309 are pulsed via wire 349 to advance their cycle of operations and change the state of one flip-flop circuit. Then, the next train of pulses will drive the motor in an opposite direction.

*Acceleration and fast speed*

Much of the following information may be applied to the circuits already described. However, it may be cumbersome to skip about from figure to figure. Therefore, it may be most convenient to study FIG. 10 which gives a unified presentation of the pertinent circuits. Any components designated by a numeral lower than 400 first appear in a previous figure. The components designated by a reference numeral higher than 400 first appear in FIG. 10.

The left-hand part of FIG. 10 includes components taken from FIG. 9, the right-hand part from FIG. 5. The reference numerals 231+, 232+ indicate not only the corresponding transistors in FIG. 9 but also all of the associated components which are used to change the RC constant of the multivibrator 172 when high speed operation is commanded. The dot-dashed rectangle 401 identifies the four drive windings in the "Slo-Syn" motor.

With the drive circuit shown in FIG. 10, an exemplary, fully loaded machine table, actually built and tested, was driven at a rate which exceeded 2700 steps per second. This is many times faster than the best speeds heretofore available from the "Slo-Syn" motor. This high speed travel is a practical necessity if the positioning table is to have widespread use. As will become more apparent, the high speed operation results from two factors. First, peak power is delivered to the motor when peak power is required. Second, drive pulses are carefully synchronized with motor operations; i.e. the pulses arrive at a time when the rotor of the motor is positioned to make full use of the power in the pulses.

The first described circuit delivers peak power at desired instants during each drive pulse. In construction, this circuit comprises a differentiating circuit 402 for giving a sharp, precisely timed drive pulse to flip-flop 312. Amplifier 403 provides the power required to energize the winding 325 for driving the motor 57 one step. The output of the amplifier 403 is a square wave, pulse form 404 having the steepest possible rising and falling, leading and trailing edges. The circuit 405, for energizing the motor winding, comprises a switch transistor 406, a capacitor 407, a diode 408, a resistor 409 and the motor winding 325. Three other circuits 410–412 are identical to the circuit 405. Each of these four circuits energizes a separate one of the motor windings 325–328.

A characteristic of the "Slo-Syn" motor is that it must begin its dynamic motion rather slowly or its static friction and inertia will cause it to stall. As the friction and inertia is overcome, the drive pulses may come progressively closer together to give the motor a higher speed. The important thing is that the acceleration of the pulse repetition rate should follow the acceleration capabilities of the motor.

Means are provided for accelerating the motor. In greater detail, the charge on the capacitor bank 225 is held at a threshold level 415 (curve II) before a fast speed signal is received. When the signal is received (point 416), the charge on the capacitors decays exponentially, as shown by the curve 417, to a stable level 418. Before occurrence of the signal (point 416), while the charge is at the threshold level 415, the output of the multivibrator 172 is a series of relatively long, slowly recurring pulses, as shown at 419, curve I. The table travels slowly at this time. During the acceleration change, time 417, the amplifiers 231+, 232+ increase their output to change the RC time constant of the multivibrator 172. Thus, during the time 417, the multivibrator 172 produces recurring pulses which are initially slow (as shown at 420) but which increase progressively in repetition rate until the capacitor charge curve reaches stability at 418. Then, the output of multivibrator 172 settles down to a fixed and uniform, high speed pulse repetition rate 421. Now the table travels fast.

As each pulse in wave form I is received at 402, it is differentiated to provide a sharp precisely positioned (with respect to time) pulse for driving the multivibrator 312. The output pulses of the multivibrator 312, drive the square wave power amplifiers 403, 422 alternately.

Since each amplifier produces the same effect at a different winding of the motor 57, consider the response at circuit 405, by way of example. A mathematical analysis of circuit 405 will show that the current through the winding 325 is described by the equation:

$$I = V/R_t + Ae^{-kt} \cos(\omega t + \alpha) + Be^{-kt} \sin(\omega t + \theta)$$

The factor $V/R_t$ is the voltage measured from the collector of the transistor 406 to $(-)V$, divided by the sum of the D.C. resistance of resistor 409 and winding 325. The current represented by this factor of the equation is described by curve III. The second or cosine factor of the above equation describes current through the capacitor 407 which is initially heavy current that falls as shown by curve IV. The third or sine factor of the equation describes the current through the winding which builds as shown by curve V. All three of these current curves (III–V) add to give the resultant curve VI. By inspection it is apparent that the current peaks at point A. For most systems, this peak A is placed along the time axis at a point which coincides with the peak power requirements of the motor as it overcomes its static friction and inertia when it takes its first step. In other systems where the loading on the motor is slight and peak starting power is much less important than high speed travel power, the peak A is placed along the time axis to coincide with peak power required to over dynamic friction at high speed.

The drive pulse repetition rate changes over the continuous range extending from zero to the maximum attainable speed. Hence, it is not exactly proper to refer to circuit 405 as resonant at any given frequency. The effect is more one of collapsing or expanding the pulse of curve VI to fit the motor needs at most usable speeds.

At the end of each drive pulse, the capacitor 407 and winding inductance 325 discharge quickly through a loop including diode 408, resistor 409 and inductance 325. The diode 408 is placed across both the inductor and RC network rather than just the inductor so as to reduce the residual current as quickly as possible. Also, diode 408 protects the base-collector junction of transistor 406.

Next to be explained is how the drive pulses are coordinated to provide high speed motor operation. For this explanation, reference is made to FIG. 11 which shows fourteen different curves, each being a series of pulse. The points in the circuits where the pulses occur are labeled at the left-hand ends of the curves. The corresponding circuits are found in FIGS. 5 and 10.

Beginning at the top of FIG. 11, the output pulses of multivibrator 172 which appear on conductor 184 are shown as entirely uniform. Actually, these pulses may vary greatly as shown by curve I of FIG. 10. Each pulse on conductor 184 causes the amplifiers 301, 302 to produce a similar pulse—except that the polarities are reversed. The first pulse (B) in a series of pulses causes the inverter 300 to turn "off" and remain "off" as long as pulses continue to arrive on conductor 184.

Responsive to each positive going edge (C) of a pulse from amplifier 301, the flip-flop 308 changes state. Likewise, each positive going edge (D) of a pulse from the amplifier 302 causes the flip-flop 309 to change state. Since the instantaneous outputs of amplifiers 301, 302 have opposite polarities, it is apparent that the outputs of the flip-flops 308, 309 are displaced from each other by one-quarter of the pulse period. One such quarter pulse period is shown at E in FIG. 11.

The positive going edges of the outputs of the flip-flops 308, 309 are used to provide sharp, precisely positioned spike pulses, such as (F) and (G), at differentiating circuits such as 402. Actually, these spike pulses must have some finite width, but they are made as narrow as possible. Thus, FIG. 11 shows them as simple vertical lines.

Each spike pulse (F, G) triggers a corresponding flip-flop 312, 313. These flip-flops, in turn, cause the pulse amplifiers 316–319 to energize the motor windings. Since each spike pulse appearing at output 314 occurs midway between two spike pulses of output 315, it is apparent that the outputs of the amplifiers 316–319 are displaced in a similar fashion. For example, the output of amplifier 316 changes state at H, J, and the output of amplifier 318 changes state at K. The point K is half way, with respect to time, between the points H, J. A careful study of the last four curves in FIG. 11 will disclose all of the timing relations between the outputs of the amplifiers 316–319.

These are the criterian used to select the characteristics of the pulses disclosed by FIG. 11. First, and most important, the windings 325–328 must be energized at the proper time and with the proper voltages to cause the "Slo-Syn" motor to turn in either a forward or backward direction, as desired.

According to the invention, current normally flows through two windings of a stopped motor. The motor is set in motion by simultaneously stopping the current in one such winding and starting it in another such winding. When the motor reaches its rotational condition, current again flows through two of the windings. In previous translators for this type motor, current existed in all motor windings at all times but two of the windings had more current flowing through them than the other windings. These previous translators set the motor in motion by simultaneously increasing the current in one winding and decreasing the current in another winding. The partially energized windings of the motor causes a braking effect which slowed the motor.

Second, the sequence and timing of pulses from amplifiers 316–319 should be controlled to provide a smooth delivery of power to the motor to give maximum torque at all speeds. Heretofore, the pulsing of the drive windings applied power to the rotor in a saw tooth fashion. At one speed, the power appearing at pole pieces coincide with the position of the rotor and applied maximum torque. Below that speed the power would tend to disappear before the rotor was in a position to make maximum use of the power. Thus, starting and accelerating torque was low. Above that speed the rotor would have passed the pole piece before the maximum power was applied. Then, when applied, the power would tend to retard the rotor's motion. These disadvantages are overcome by the invention.

According to this invention, the acceleration curve II (FIG. 10) coincides with the motor characteristics so that the pulse repetition rate (curve I) changes with rotor speed in a manner such that the energized winding is always synchronized with the position of the rotor. Moreover, the collapsing or expanding wave form (curve VI) has characteristics such that the peak A tends to coincide with the peak power needs of the motor at the varying speeds.

While the principles of the invention have been described above in connection with specific apparatus and applications, it is to be understood that this description is made only by way of example and not as a limitation on the scope of the invention.

We claim:

1. A numerically controlled positioning system comprising a table mounted for traverse in "X" or "Y" directions, drive means individual to each of said directions of traverse, each of said drive means comprising a stepping motor coupled to rotate a feed screw over a fixed arcuate distance each time that said motor is pulsed, means for coupling said feed screws to drive the table step-by-step in each of said directions when the corresponding stepping motor rotates the corresponding feed screw, thus each step of the motor drives the table over a fixed distance of lateral traverse, a source of numerical data for indicating a desired table position in terms of its X- and Y-coordinate locations, means for storing said data in two counters one for the X-direction and one for the Y-direction, at least one source of recurring pulses, means responsive to said pulses for energizing each of the stepping motors at either a fast or a slow speed depending upon the distance which the table is required to travel to reach said desired position, means responsive to mechanical movement in said system for generating a signal to indicate that said motor has actually stepped said table, means responsive to the generation of said signal for driving the counters a step toward their zero positions, and means responsive to the counters reaching their zero position for stopping the table.

2. The system of claim 1 and means for increasing the rate at which said pulses recur in conformance with the acceleration characteristics of the motors, and means for shaping said pulses to provide peak power at a time in said pulse period which coincides with the power needs of said motor.

3. A positioning device for moving a workpiece either forward or backward in at least one direction of motion responsive to the receipt of numerical data comprising a stepping motor connected directly to a feed screw mounted parallel to said direction of motion and threaded through a nut associated with said device, means for storing said numerical data in a counter associated with said direction of motion, a source of recurring pulses, means responsive to said recurring pulses for pulsing said motor to drive said feed screw and said counter to substract a count from said numerical data stored therein [and] means responsive to said counter counting down to zero for discontinuing said pulsing of said motor to stop said device [.], feedback means responsive to each mechanical step of said device for returning a signal to enable the next of said recurring pulses to drive said motor, and means responsive to a failure of said feedback means to return said enable signal when said motor is pulsed for stopping said motor and giving an alarm.

4. A positioning device for moving a workpiece either forward or backward in at least one direction of motion responsive to the receipt of numerical data comprising a stepping motor connected directly to a feed screw mounted parallel to said direction of motion and threaded through a nut associated with said device, means for storing said numerical data in a counter associated with said direction of motion, a source of recurring pulses, means responsive to said recurring pulses for pulsing said motor to drive said feed screw and said counter to substract a count from said numerical data stored therein, means responsive to said counter counting down to zero for discontinuing said pulsing of said motor to stop said device, feedback means responsive to each mechanical step of said device for returning a signal to enable the next of said recurring pulses to drive said motor means responsive to the storage in said counter of a numerical data greater than a predetermined value for commanding said motor to step at a fast rate of speed, means responsive to said fast speed command for causing said pulse source to accelerate the recurrence of said pulses at a rate of acceleration which corresponds to the acceleration capabilities of said motor, and means for precluding said fast command from taking effect if said device is within a predetermined distance from the limit of its travel.

5. A positioning device for moving a workpiece either forward or backward in at least one direction of motion responsive to the receipt of numerical data comprising a stepping motor connected directly to a feed screw mounted parallel to said direction of motion and threaded through a nut associated with said device, means for storing said numerical data in a counter associated with said direction of motion, a source of recurring pulses, means responsive to said recurring pulses for pulsing said motor to drive said feed screw and said counter to subtract a count from said numerical data stored therein, feedback means responsive to each mechanical step of said device for returning a signal to enable the next of said recurring pulses to drive said motor, means responsive to said counter counting down to zero for discontinuing said pulsing of said motor to stop said device, wherein said source of recurring pulses comprises a free-running multivibrator, electronic circuit means comprising at least one capacitor device for changing the repetition rate at which said multivibrator produced pulses recur responsive to the receipt of a fast speed command signal, the time constant at which the changes in repetition rate recur being controlled by charges on said capacitor device and corresponding to the acceleration capabilities of said motor, and means for maintaining the charge on said capacitor at a threshold level prior to the receipt of said fast speed command signal, whereby the motor responds quickly to the receipt of said fast speed command signal.

6. A positioning device for moving a workpiece either forward or backward in at least one direction of motion responsive to the receipt of numerical data comprising a stepping motor connected directly to a feed screw mounted parallel to said direction of motion and threaded through a nut associated with said device, means for storing said numerical data in a counter associated with said direction of motion, a source of recurring pulses, means responsive to said recurring pulses for pulsing said motor to drive said feed screw and said counter to substract a count from said numerical data stored therein, means responsive to said counter counting down to zero for discontinuing said pulsing of said motor to stop said device, feedback means responsive to each mechanical step of said device for returning a signal to enable the next of said recurring pulses to drive said motor, and means for pulsing said motor comprises translator means for converting said recurring pulses into signals for driving said stepping motor, said translator means including an electronic gear box means for preventing said motor from changing its direction of rotation while in motion, means for normally preparing said gear box to turn said motor in a given direction when said motor is next energized, and means responsive to a change of direction signal for reversing the preparation of said electronic gear box to turn said motor in a direction opposite to said given direction when said motor is next energized.

7. A positioning device for moving a workpiece either forward or backward in at least one direction of motion responsive to the receipt of numerical data comprising a stepping motor connected directly to a feed screw mounted parallel to said direction of motion and threaded through a nut associated with said device, means for storing said numerical data in a counter associated with said direction of motion, a source of recurring pulses, means responsive to said recurring pulses for pulsing said motor to drive said feed screw and said counter to substract a count from said numerial data stored therein, means responsive to said counter counting down to zero for discontinuing said pulsing of said motor to stop said device, feedback means responsive to each mechanical step of said device for returning a signal to enable the next of said recurring pulses to drive said motor, said motor comprises at least one winding for causing said motor to step each time that said winding is energized, an electronic switch means for energizing and de-energizing said winding when said switch is "on" and "off" respectively, means comprising a capacitance device for reacting with said winding when said switch is "on" to provide drive pulses having a power peak positioned with respect to time to deliver peak power to said motor at a predetermined time during the step cycle of said motor, and means comprising a rectifier device connected across both said capacitance device and said winding to quickly discharge said capacitance device and said winding when said switch switches "off."

8. A numerical positioning table comprising a table mounted for movement in any of a plurality of directions, means comprising a feed screw extending in each of said directions for imparting mechanical motion to said table, each end of each of said feed screws being rotatably secured to the table and threaded through a stationary nut positioned intermediate the ends of said feed screw, a stepping motor connected to one end of said feed screw and a position indicator connected to the other end of said feed screw, and electronic gear and clutch for means for controlling said stepping motor and the application of power to said feed screws, a pulse supply source having an output which varies over a continues range extending from a motor stopped condition to a maximum pulse repetition rate which corresponds to the maximum speed of said stepping motor, and means for causing said pulse repetition rate to increase at a predetermined path of increase over said range to provide an acceleration pattern for said pulse source corresponding to the acceleration capability of said motor.

9. The table of claim 8 and means for delivering pulses to windings of said motor with a pulse wave shape which provides peak power coinciding with the peak power requirements of said motor, the arrival of said pulses being synchronized with the rotational position of the parts of said motor.

10. The table of claim 9 wherein said wave shaping means comprises a transistor coupled to energize a winding of said motor via a parallel resistor-capacitor network, and diode means coupled across said winding and said parallel network to quickly discharge said winding and capacitor at the end of each of said pulses.

11. The table of claim 9 and means for changing the pulse repetition rate of said delivered pulses over a continuous range extending from a motor stopped condition to the maximum speed attainable from said motor, and means for collapsing or expanding the wave form to said pulses to coincide with motor requirements as such requirements change as a function of the changes in said repetition rate.

12. The table of claim 8 wherein said electronic means comprises drive control means for energizing the windings of said motor in a given sequence to drive said motor in a given direction of rotation, means for normally switching said drive control means to a predetermined state relative to said sequence prior to each operation of said motor for preparing to drive said motor in said given direction, means responsive to a change of direction signal for changing the states of said drive control means to an off-normal state in said sequence, and means responsive to operation of said drive control means from said off-normal state for driving said motor in a direction of rotation which is opposite to said given direction.

13. A numerical positioning table comprising a table mounted for movement in any of a plurality of directions, means comprising a feed screw extending in each of said directions for imparting mechanical motion to said table, each end of each of said feed screws being rotatably secured to the table and threaded through a stationary nut positioned intermediate the ends of said feed screw, a stepping motor connected to one end of said feed screw and a position indicator connected to the other end of said feed screw, electronic gear and clutch for means for controlling said stepping motor and the application of power to said feed screws, a pulse supply source having an output which varies over a continuous range extending from a motor stopped condition to a maximum pulse repetition rate which corresponds to the maximum speed of said stepping motor, means for controlling said pulse reptition rate over said range to provide an acceleration pattern for said pulse source corresponding to the acceleration capability of said motor, wherein said pulse source comprises a multivibrator, said means for providing said acceleration pattern comprises at least one device having a variable impedance which changes at a predetermined rate as a function of time, circuit means for varying the speed of said multivibrator as a function of changes in the impedance of said variable impedance, and means responsive to the receipt of a fast speed command signal for causing said impedance to vary and thereby change the speed of said multivibrator at said predetermined rate.

14. The table of claim 13 wherein said variable impedance comprises at least one capacitor, voltage stabilized circuit means for holding the charge on said capacitor at a threshold value which is just less than the value required to accelerate said multivibrator, and means comprising said stabilized circuit means whereby said multivibrator increases its speed at an acceleration rate fixed by the change in charge on said capacitor.

15. A numerical positioning table comprising a table mounted for travel in any of a plurality of directions to locations identified by multi-digit command numbers, means comprising a feed screw extending in each of said directions for imparting mechanical motion to said table, a stepping motor individually associated with each of said feed screws, a plurality of counter circuits each having a number of storage tanks corresponding to the number of digits in the command numbers which identify a desired table location in a given direction of travel there being one such counter for each direction of table travel, means comprising a pulse supply source having a minimum pulse repetition rate which corresponds to a motor stopped condition and a maximum pulse repetition rate which corresponds to the maximum speed of a stepping motor, means for controlling said pulse repetition rate to provide an acceleration pattern for said source which corresponds to the acceleration capability of said motor, means responsive to the output of said source for simultaneously driving said motor and causing the corresponding counter to lose one count responsive to each increment of table motion, and means for stopping table motion in each direction when the counter associated with such direction counts down to zero, whereby said table travel is stopped in each of said plurality of directions independently of the stopping of said table in any other of said plurality of directions of travel.

16. The table of claim 15 and variable speed control means for controlling the repetition rate of said pulses, means for causing said repetition to be a fast drive rate in a particular direction of said table travel if a digit of a predetermined significance is stored in the counter associated with that direction of travel, and means for causing said repetition to be a slow drive rate in that particular direction if a digit of said predetermined significance is not stored in said counter associated with that direction, whereby said table moves in either fast or slow speeds in any direction of table travel independently of table speed in other directions.

17. The table of claim 16 and means for providing a feedback signal responsive to each pulse caused mechanical motion of said motor for commanding said source to send another pulse to drive said motor another step, whereby said counter loses said one count per step only if said motor does in fact step.

18. The table of claim 15 and means for delivering pulses from said source to said motor with a wave shape providing peak power coinciding with the peak power requirements of said motor, the arrival of said pulses being synchronized with the position of the parts of said motor when said pulses arrive.

19. The table of claim 18 and means for collapsing or expanding said wave form to provide peak power which changes as a function of the speed of said motor.

20. The table of claim 18 and means responsive to the output from said pulse source for energizing a winding of said motor via a parallel resistor-capacitor network, and diode means coupled across said winding and network to quickly discharge said winding and capacitor at the end of each pulse.

21. A numerical positioning table comprising a table mounted for travel in any of a plurality of directions to locations identified by multi-digit command numbers, means comprising a feed screw extending in each of said directions for imparting mechanical motion to said table, a stepping motor individually associated with each of said feed screws, a plurality of counter circuits each having a number of storage tanks corresponding to the number of digits in the command numbers which identify a desired table location in a given direction of travel there being one such counter for each direction of table travel, means comprising a pulse supply source having a minimum pulse repetition rate which corresponds to a motor stopped condition and a maximum pulse repetition rate which corresponds to the maximum speed of a stepping motor, variable speed control means for controlling the repetition rate of said pulses, means for causing said repetition to be a fast drive rate in a particular direction of said table travel if a digit of a predetermined significance is stored in the counter associated with that direction of travel, means for causing said repetition to be a slow drive rate in that particular direction if a digit of said predetermined significance is not stored in said counter associated with that direction, whereby said table moves in either fast or slow speeds in any direction of table travel independently of table speed in other directions, said speed control means comprises at least two transistors, means including at least one capacitor coupled to control the bias applied to a control electrode of one of said transistors, an output electrode on said one transistor coupled via a diode to a control electrode on the other of said transistors, means coupled to the output of said other transistor for controlling the charge on said capacitor, whereby a feedback occurs to hold a quiescent charge on said capacitor at a threshold potential, said pulse supply source comprising multivibrator means coupled to receive the output of said one transistor for producing output pulses at a pulse repetition rate which varies as a function of current through said one transistor, and means responsive to the receipt of a command signal for varying the conductive state of said one transistor, whereby the charge on said capacitor varies from said threshold potential almost instantaneously.

22. A translator for controlling a stepping motor having a plurality of windings comprising a source of pulses, means responsive to the receipt of each pulse from said source for driving said motor one step, means for controlling the sequence in which said pulses are applied to said windings to prevent said motor from trying to reverse direction while equipment driven by said motor is in motion, buffer means interposed between said motor and said sequence controlling means to prevent the loading thereof, and means for providing a feedback signal responsive to motion of said motor for enabling said source to apply another of said pulses to drive said motor another step only if said motor actually took the preceding step, wherein said sequence controlling means comprises a pair of flip-flop circuits coupled to energize the windings of said motor in a given sequence, means for switching said flip-flop circuits to a predetermined normal state prior to each operation of said motor for preparing said translator to drive said motor in said given direction, means responsive to a change of direction signal for thereafter advancing the states of said flip-flop circuits to an off-normal state, thereby changing said sequence, and means responsive to the output of said flip-flop circuits from said off-normal state for driving said motor in a direction opposite to said given direction.

23. A translator for controlling a stepping motor having a plurality of windings comprising a source of pulses, means responsive to the receipt of each pulse from said source for driving said motor one step, means for controlling the sequence in which said pulses are applied to said windings to prevent said motor from trying to reverse direction while equipment driven by said motor is in motion, buffer means interposed between said motor and said sequence controlling means to prevent the loading thereof, and means for providing a feedback signal responsive to motion of said motor for enabling said source to apply another of said pulses to drive said motor another step only if said motor actually took the preceding step, and means for delivering said pulses to said motor with a wave shape that provides peak power coinciding with the peak power requirements of said motor, and means for synchronizing the arrival of said pulses with the position of the parts of said motor.

24. The translator of claim 23 and means for collapsing and expanding said wave shape to provide peak power which coincides with motor power needs which change as a function of motor speed.

25. A translator for controlling a stepping motor having a plurality of windings comprising a source of pulses, means responsive to the receipt of each pulse from said source for driving said motor one step, means for controlling the sequence in which said pulses are applied to said windings to prevent said motor from trying to reverse direction while equipment driven by said motor is in motion, buffer means interposed between said motor and said sequence controlling means to prevent the loading thereof, and means for providing a feedback signal responsive to motion of said motor for enabling said source to apply another of said pulses to drive said motor another step only if said motor actually took the preceding step, and electronic switch means coupled to energize a winding of said motor via a parallel resistor-capacitor network, and diode means coupled across said winding and network to discharge said winding and capacitor at the end of each of said pulses.

26. A translator for controlling a stepping motor comprising means for preventing said motor from changing direction of rotation while said motor is in motion, means for normally preparing said motor to turn in a given direction when said motor is next energized, means responsive to a change of direction signal for changing the preparation of said motor to cause said motor to turn in a direction opposite to said given direction when said motor is next energized, a free running source of recurring pulses, means responsive to said pulses for energizing windings of said motor in a sequence to cause said motor to turn in either a forward or backward direction, means responsive to termination of said pulses for quickly reducing current in the windings energized by said terminated pulse, means comprising at least one capacitor for changing the repetition rate at which said pulses recur responsive to the receipt of a fast speed command signal, the time constant at which the charge on said capacitor changes corresponding to the acceleration capabilities of said motor, and means for maintaining a charge on said capacitor at a threshold level prior to the receipt of said fast speed command signal, whereby the motor responds quickly to the receipt of said fast speed command signal.

27. The circuit of claim 26 and means for shaping the pulses applied to said windings to provide peak power which coincides with the motor characteristics, the wave form of said pulses collapsing or expanding to provide characteristics such that the peak in the pulse tends to coincide with the peak power needs of the motor at varying speeds.

28. In a translator for a stepping motor having a plurality of windings, means for normally energizing said motor when stopped so that current flows simultaneously through only two of said windings, means for simultaneously starting current flow in only one of said windings and stopping the current flow in another of said windings to start said motor, and means for thereafter energizing only two of said windings at any given time to provide a continuously rotational condition.

29. The translator of claim 28 and means whereby said windings are energized in a timed sequence to provide a smooth delivery of power to said motor at all speeds with peak power coinciding with the rotor position to provide a maximum torque at all speeds.

30. A speed control circuit for a stepping motor comprising at least two transistors, means including at least one capacitor coupled to control the bias applied to a control electrode of one of said transistors, an output electrode on said one transistor coupled via a diode to a control electrode on the other of said transistors, means coupled to the output of said other transistor for controlling the charge on said capacitor, whereby a feedback occurs to hold a quiescent charge on said capacitor at a threshold potential, a pulse source means coupled to said one transistor for producing output pulses at a pulse repetition rate which varies as a function of current through said one transistor, and means responsive to the receipt of a command signal for varying the conductive state of said one transistor, whereby the charge on said capacitor varies from said threshold potential and the output of said source begins to change almost instantaneously and thereafter continues to change as a function of the charge on said capacitor.

31. A stepping motor speed control circuit comprising at least two transistors, multivibrator means coupled to one of said transistors for producing output pulses which recur at a pulse repetition rate that varies as a function of current through said one transistor, means for controlling said repetition rate including at least one capacitor coupled to control the bias applied to a control electrode of said one transistor, an output electrode on said one transistor coupled via a diode to a control electrode on the other of said transistors, means coupled to the output of said other transistor for controlling the charge on said capacitor, whereby a feedback occurs to hold a quiescent charge on said capacitor at a threshold potential, means responsive to the receipt of a command signal for varying the conductive state of said one transistor, means comprising a stabilized voltage source for fixing said threshold charge on said capacitor before said command signal is received, and means also comprising said stabilized voltage source for fixing the rate at which said capacitor charges to provide a uniform acceleration curve after receipt of said command signal.

32. The speed control circuit of claim 31 and means whereby said feedback causes said two transistor circuits to oscillate for sequentially charging said capacitor and allowing said charge to leak off said capacitor.

33. The circuit of claim 31 and means comprising a normally back-biased diode coupled between one side of said capacitor and ground for preserving the polarity of charge potentials on said capacitor.

34. The circuit of claim 31 wherein said multivibrator circuit comprises a pair of transistors having substantially the same characteristics, and temperature compensating means comprising a circuit connected to supply each of said transistors via one junction of other transistors also having said same characteristics, the one of the junctions of said other transistors that is used being selected to provide temperature caused variations exactly complementary to the temperature caused variations in said pair of transistors.

35. A stepping motor speed control circuit comprising a free running source of recurring pulses, electronic circuit means comprising a variable impedance device for changing the repetition rate at which said pulses recur responsive to the receipt of a fast speed command signal, means whereby the time constant at which the impedance of said variable impedance changes corresponding to the acceleration capabilities of said motor, and means for maintaining said variable impedance at a threshold level of impedance prior to the receipt of said fast speed command signal to enable the motor to respond quickly to the receipt of said fast speed signal.

36. The speed control circuit of claim 35 wherein said variable impedance device comprises a capacitance and said means for maintaining said threshold level comprises circuit means which oscillates to sequentially charge and allow said charge to leak off said capacitance.

37. A positioning device for moving a workpiece in at least one direction responsive to the receipt of numerical data comprising a stepping motor having a plurality of windings, means for storing said numerical data in a counter associated with said direction of motion, means responsive to each in a series of recurring pulses for causing said motor to drive said workpiece one step toward a desired location, means for providing a feedback signal responsive to mechanical motion of said motor, means responsive to said feedback signal for thereafter driving said motor another step responsive to the next in said series of pulses only if said motor actually took the preceding step, means also responsive to said feedback signal for causing said counter to subtract a count from the numerical data stored in said counter, and means responsive to said counter counting down to zero for stopping said motor.

References Cited

UNITED STATES PATENTS

| | | | |
|---|---|---|---|
| 2,922,940 | 1/1960 | Mergler | 318—30 X |
| 3,015,806 | 1/1962 | Wang et al. | 318—162 X |
| 3,021,464 | 2/1962 | Philip | 318—162 |
| 3,090,897 | 5/1963 | Hammann | 318—138 |
| 3,098,187 | 7/1963 | Sciaky | 318—162 |
| 3,124,732 | 3/1964 | Dupy | 318—138 |
| 3,154,730 | 10/1964 | Houldin et al. | 318—313 X |
| 3,202,895 | 8/1965 | Arp et al. | 318—162 |
| 3,206,665 | 9/1965 | Burlingham | 318—312 |
| 3,287,569 | 11/1966 | Carney | 318—138 X |
| 3,304,480 | 2/1967 | Ko | 318—138 |

BENJAMIN DOBECK, *Primary Examiner.*